(12) United States Patent
Bollman

(10) Patent No.: US 9,637,921 B1
(45) Date of Patent: May 2, 2017

(54) SYSTEM FOR ASSEMBLY OF MODULAR WORKSTATIONS USING QUAD-BEAMS AND RAIL-ARM-LEG MODULES

(71) Applicant: Clifford Bollman, Vancouver, WA (US)

(72) Inventor: Clifford Bollman, Vancouver, WA (US)

( * ) Notice: Subject to any disclaimer, the term of this patent is extended or adjusted under 35 U.S.C. 154(b) by 0 days.

(21) Appl. No.: 15/080,506

(22) Filed: Mar. 24, 2016

Related U.S. Application Data

(63) Continuation-in-part of application No. 14/678,644, filed on Apr. 3, 2015, now abandoned.

(60) Provisional application No. 62/137,681, filed on Mar. 24, 2015, provisional application No. 61/974,676, filed on Apr. 3, 2014.

(51) Int. Cl.
*F16M 11/20* (2006.01)
*E04C 3/04* (2006.01)
*A47B 13/02* (2006.01)
*A47B 37/00* (2006.01)
*E04B 1/24* (2006.01)

(52) U.S. Cl.
CPC ............ *E04C 3/04* (2013.01); *A47B 13/02* (2013.01); *A47B 37/00* (2013.01); *E04B 1/24* (2013.01); *E04B 2001/2472* (2013.01); *E04C 2003/0413* (2013.01)

(58) Field of Classification Search
CPC ... E04C 3/04; E04C 2003/0413; A47B 13/02; A47B 37/00; E04B 1/24; F16M 11/041
See application file for complete search history.

(56) References Cited

U.S. PATENT DOCUMENTS

| | | | | |
|---|---|---|---|---|
| 6,315,538 B1* | 11/2001 | Tagami | .................. | F01C 1/40 418/117 |
| 6,425,631 B1* | 7/2002 | Lin | ..................... | A47B 21/03 297/170 |
| 6,644,748 B2* | 11/2003 | Tholkes | .................. | A47B 9/00 248/280.11 |
| 7,134,719 B2* | 11/2006 | Moglin | .................. | A47C 7/72 297/170 |
| 8,141,949 B2* | 3/2012 | Baru | .................... | A47B 21/00 297/172 |
| 2011/0179980 A1* | 7/2011 | Sturgeon, Jr. | .......... | A47B 13/02 108/161 |

\* cited by examiner

*Primary Examiner* — Amy Sterling
(74) *Attorney, Agent, or Firm* — Rylander & Associates, PC; Philip R. M. Hunt

(57) ABSTRACT

Embodiments of a quad-beams and rail-arm-leg modules for use in modular assembly systems for office and industrial work stations. The embodiments have four corner tubes, bars, or channels arranged in a rectangular pattern in cross-section and connected in ways that provide improved ability to transmit torque along a long axis of the multi-track beam while providing improved resistance to twisting under the forces of the torque.

6 Claims, 37 Drawing Sheets

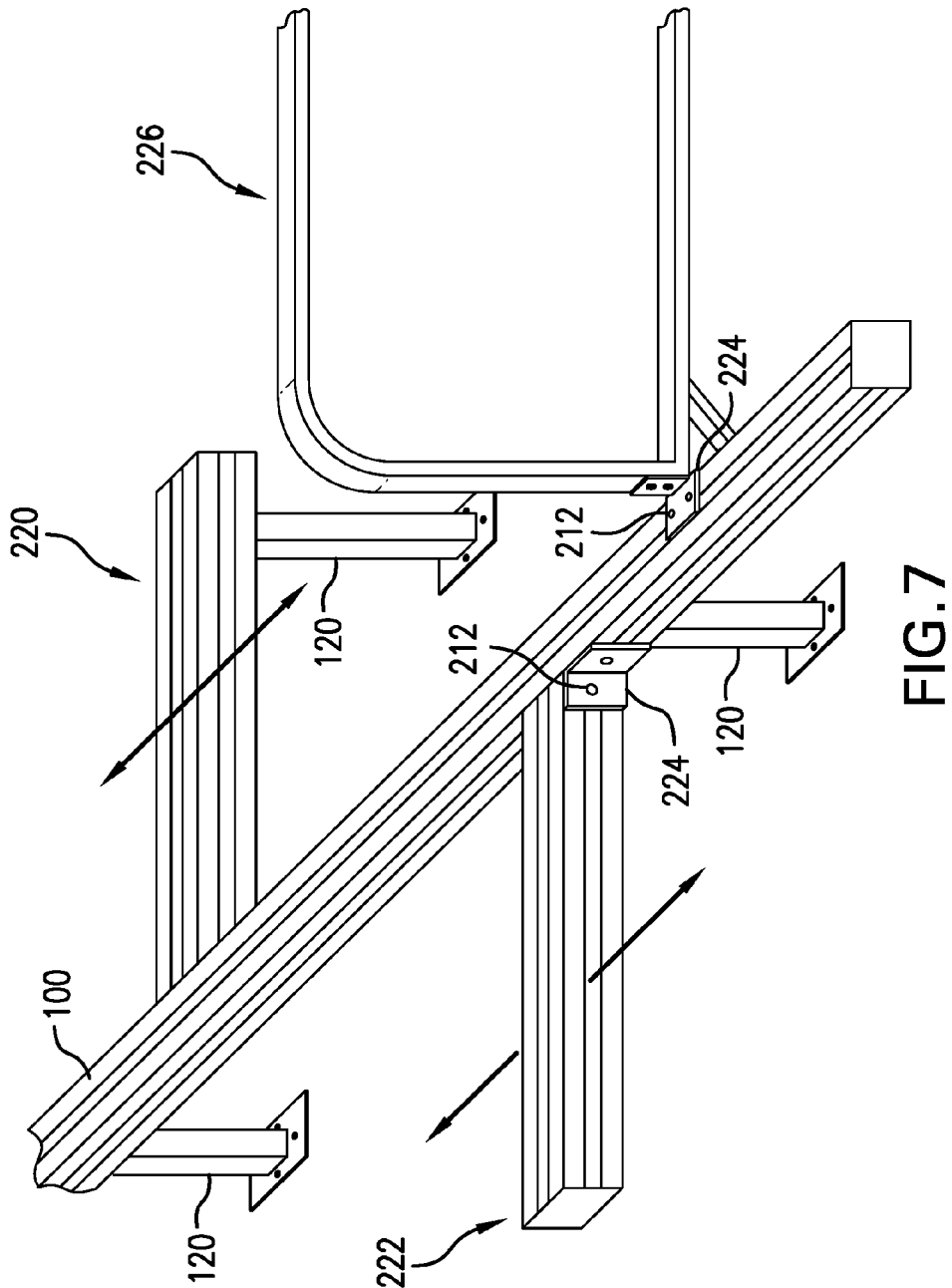

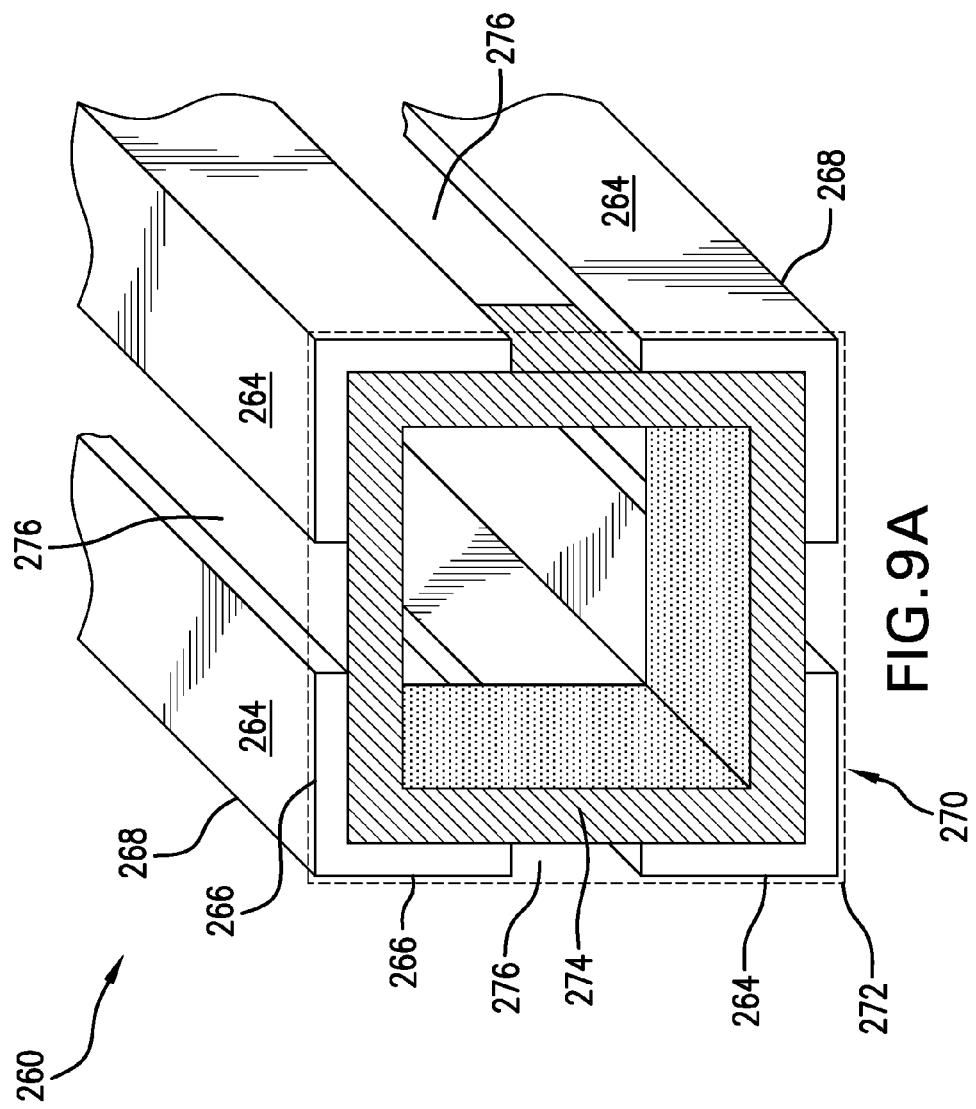

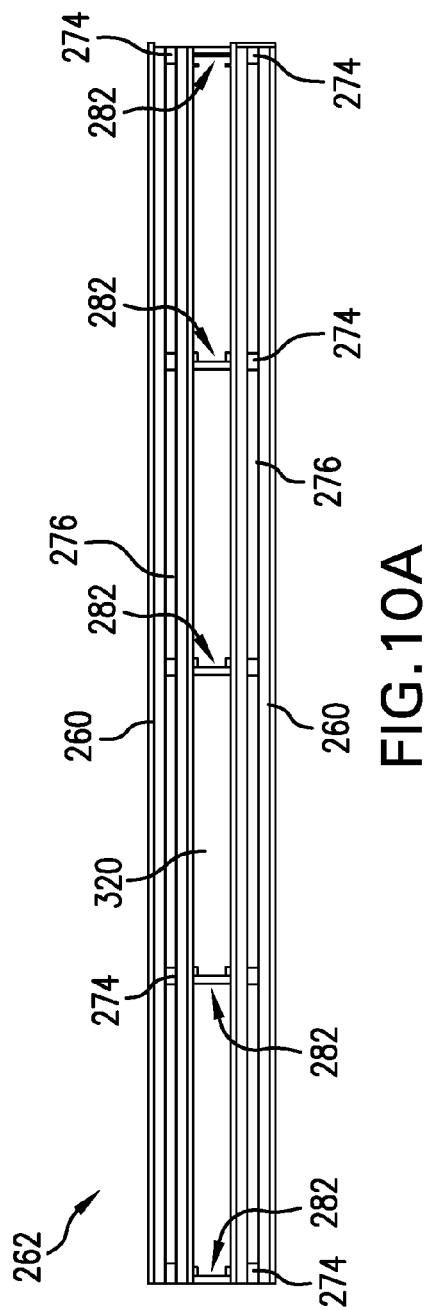
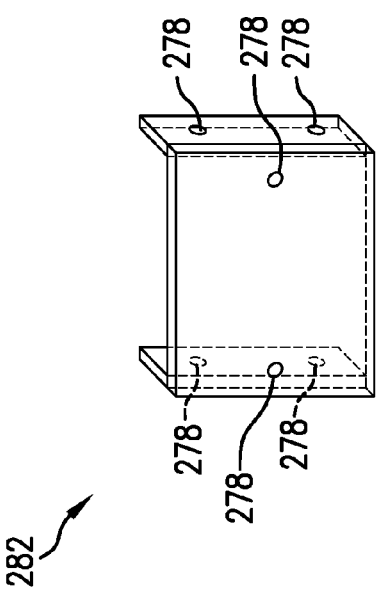

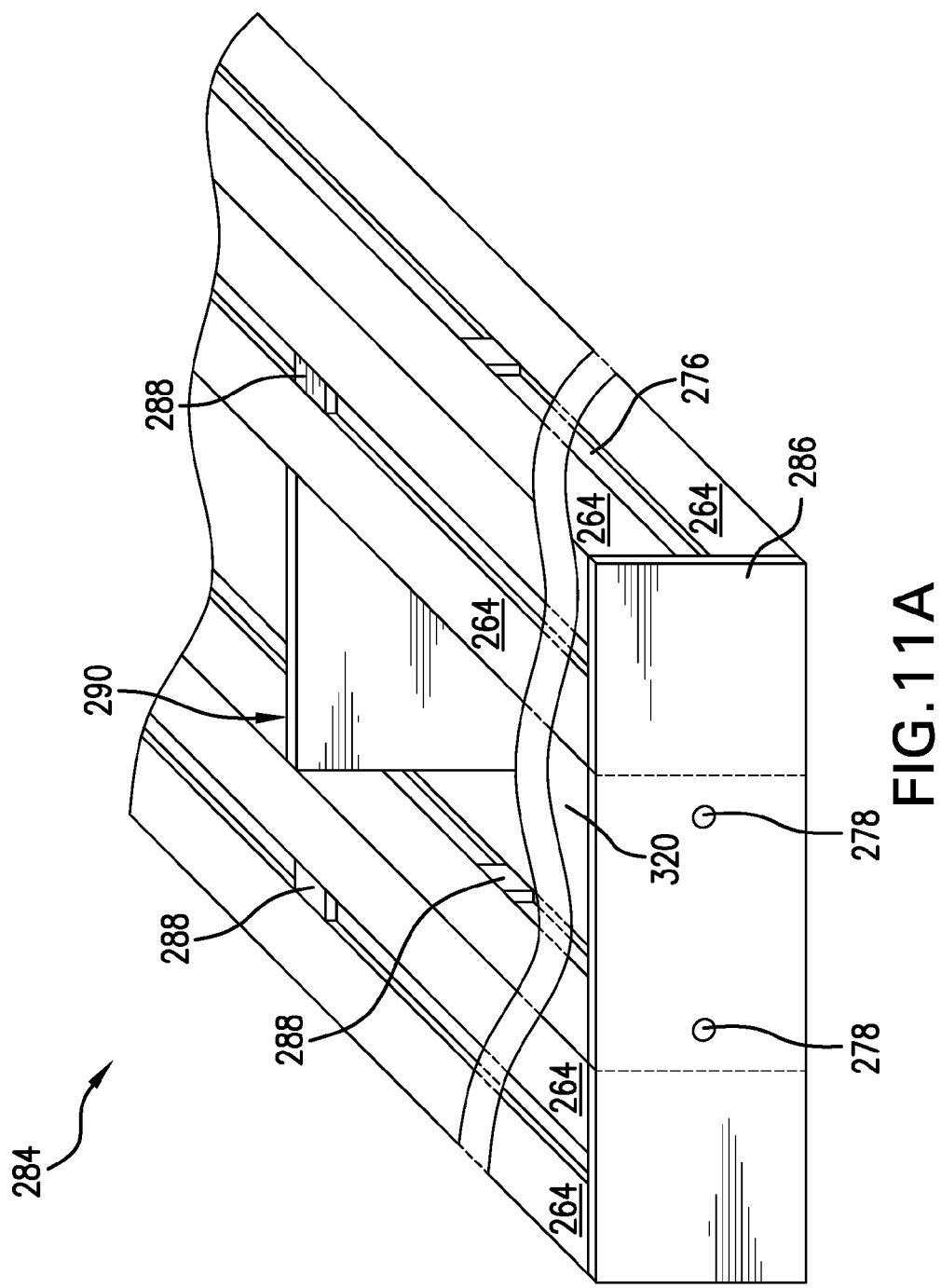

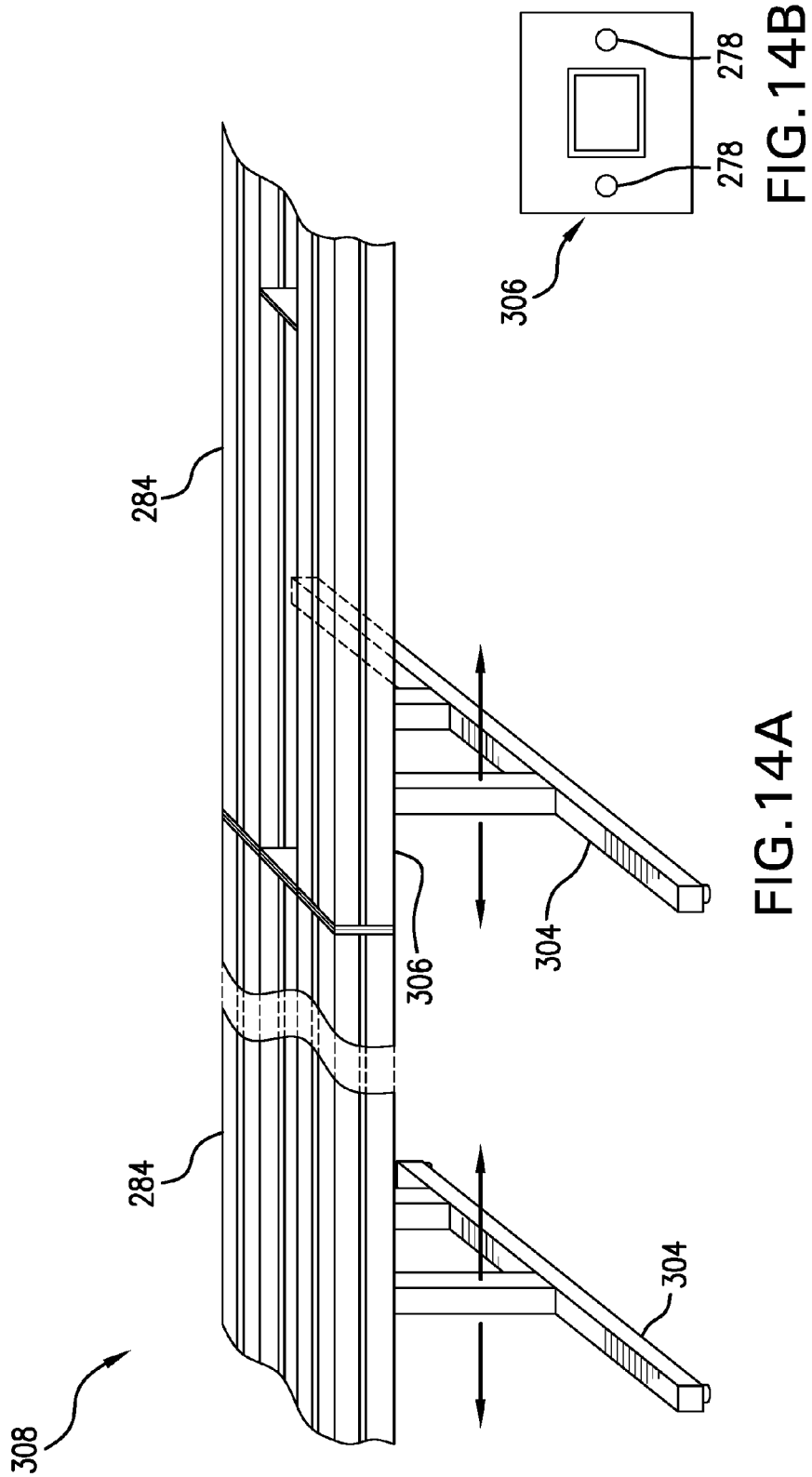

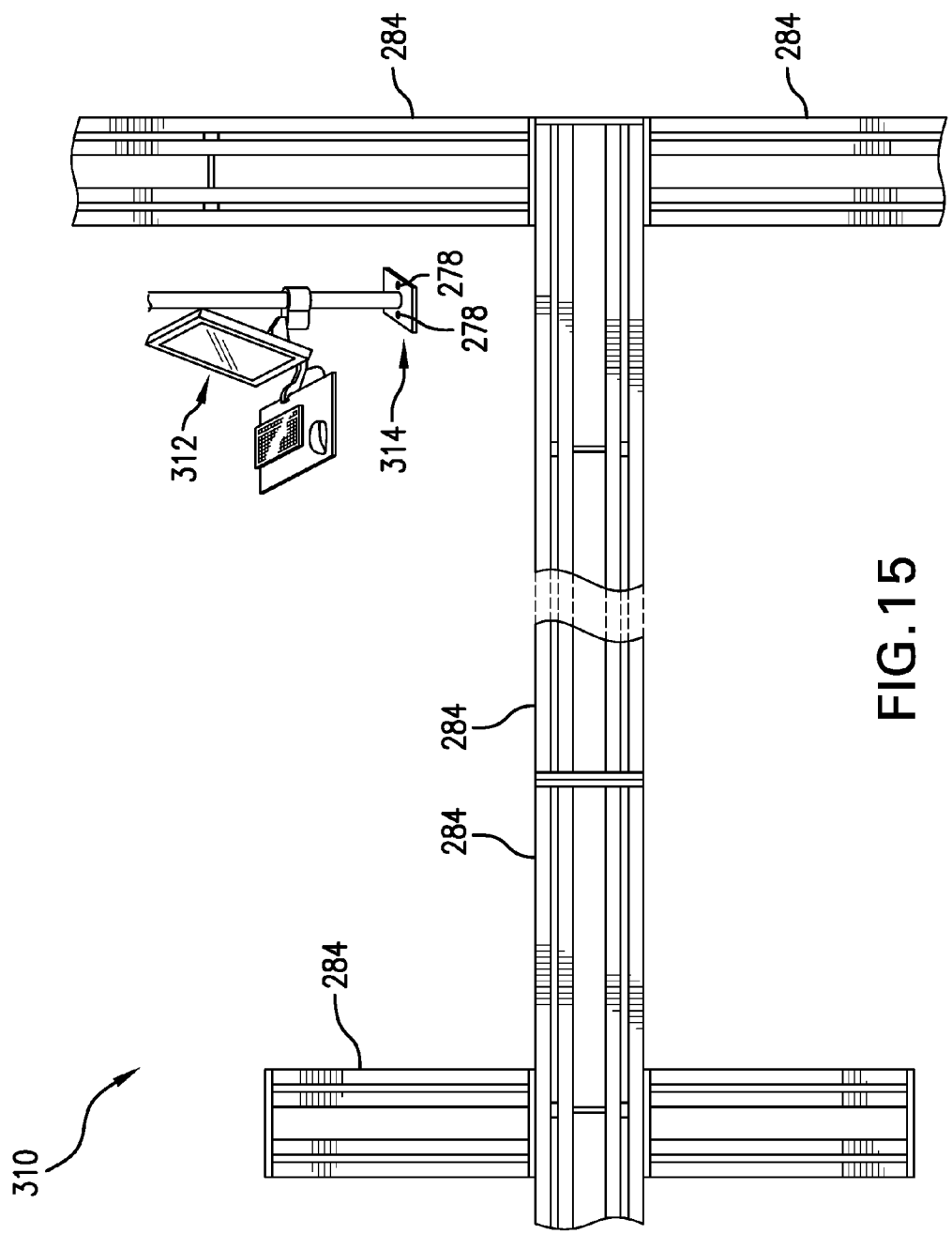

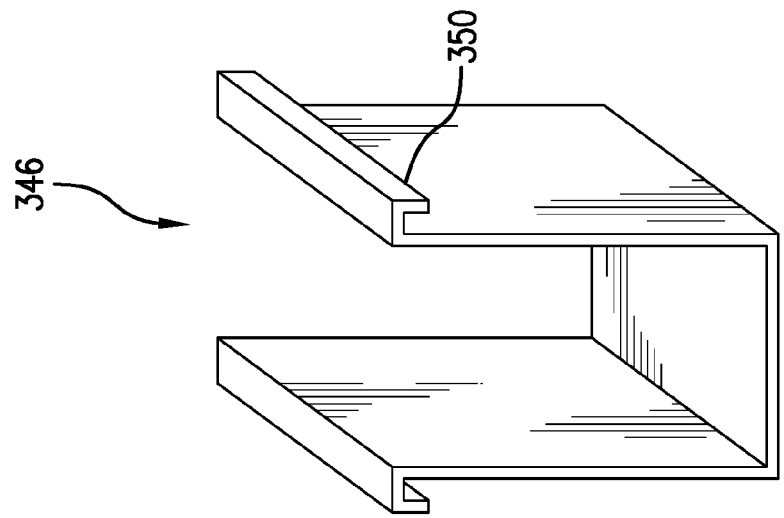
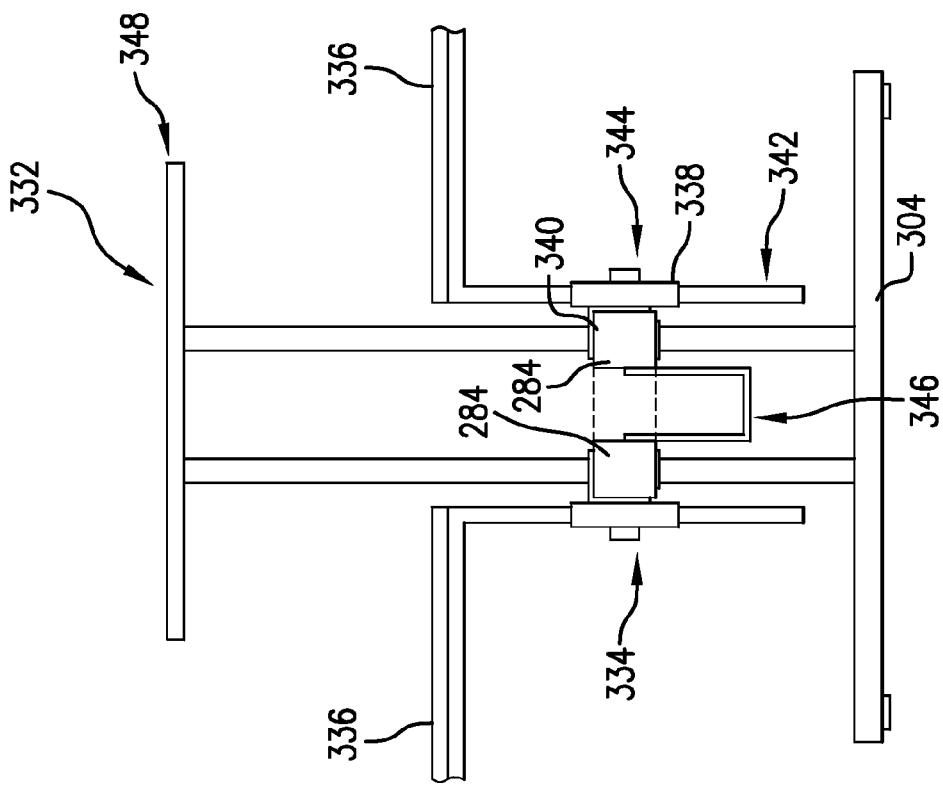
FIG. 19B
FIG. 19A

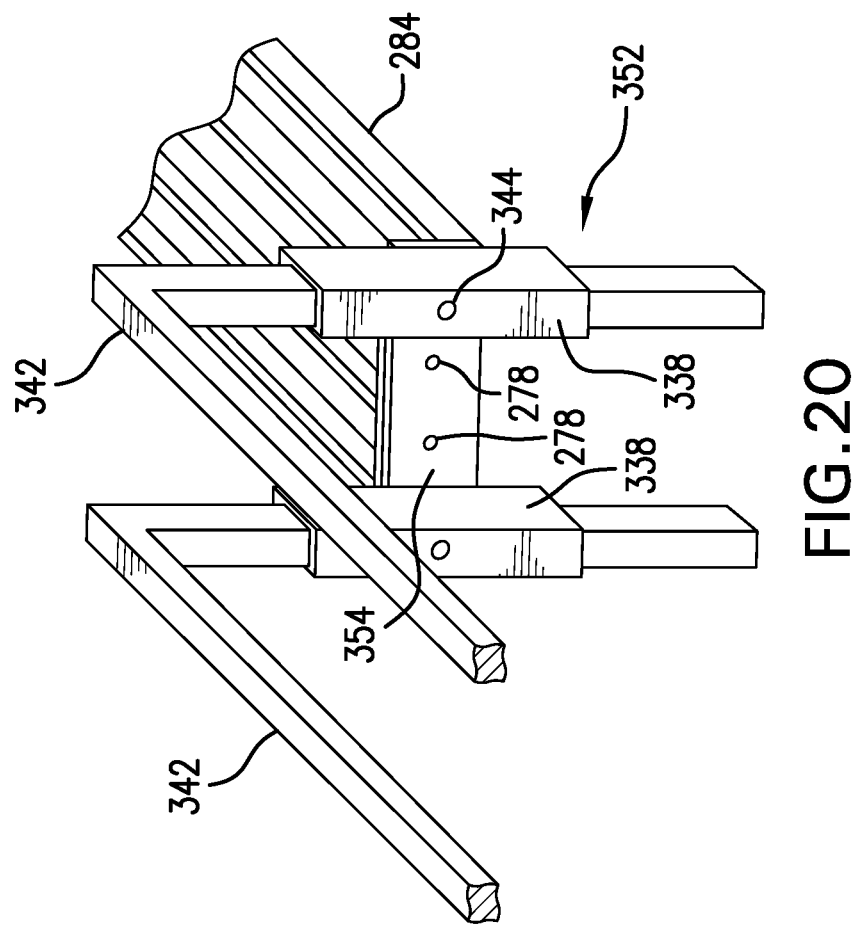

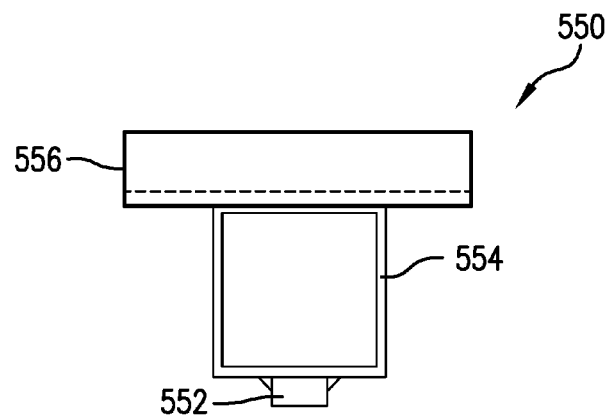
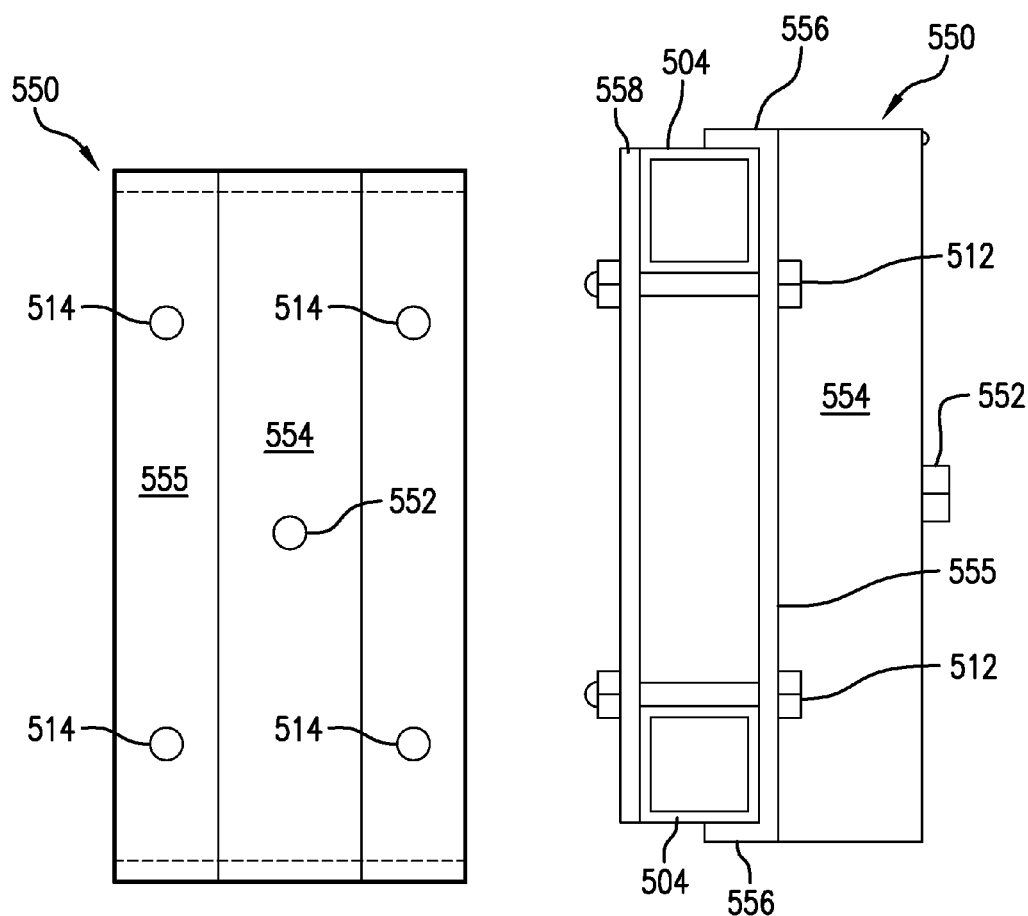
FIG.29A
FIG.29B    FIG.29C

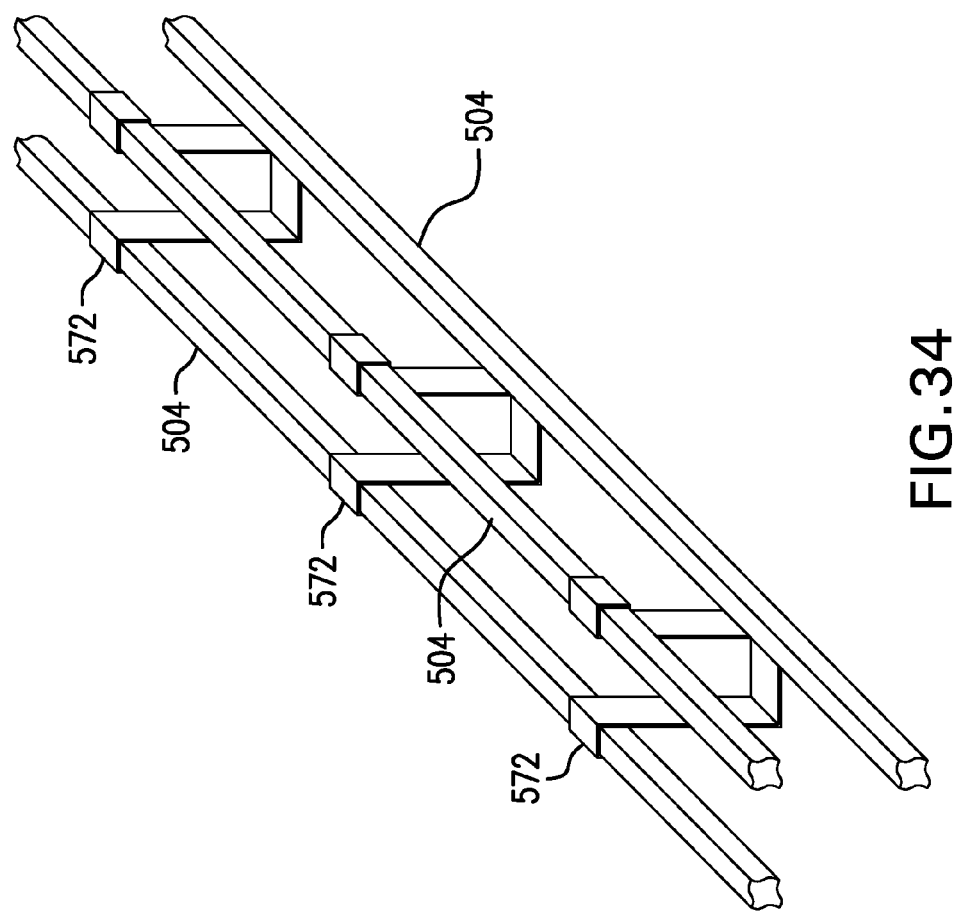

SYSTEM FOR ASSEMBLY OF MODULAR WORKSTATIONS USING QUAD-BEAMS AND RAIL-ARM-LEG MODULES

CROSS-REFERENCE TO RELATED APPLICATION

The present application is a continuation-in-part application of application Ser. No. 14/678,644, filed 3 Apr. 2015, which in turn claims the benefit of, and priority to, U.S. Provisional Application No. 61/974,676 filed on 3 Apr. 2014, and U.S. Provisional Application No. 62/137,681 filed on 24 Mar. 2015, both incorporated herein by reference.

FIELD OF THE INVENTION

The present invention relates to modular assembly systems. More particularly, the present invention relates to modular assembly systems for office and industrial work stations.

BACKGROUND

Modular building assembly systems have long been available to for the construction and erection of various structures such as office cubicles, industrial work stations, and scaffolding. Such modular building assembly systems usually have some type of standard beam that can be joined to other beams and to which various accessories can be attached. Solid bars, of circular or regular polygonal shape (such as square or hexagonal) may be used, but are inferior to tubes of the same shape because tubes have a better resistance to torsion for the same mass of material than do solid bars. Circular or regular polygons lack an easy point of attachment for accessories and other beams, so more complex shapes are preferred. One such complex shaped beam is a cruciform beam (see U.S. Pat. No. 5,481,842 to Gautreau, FIG. 1). The cruciform beam comprises a center tube surrounded by four angle bars arranged in a square pattern in cross-section and each joined to the center tube with a web or fin, the fins forming a cross when the beam is viewed in cross-section. Accessories can be attached along the cruciform beam by clamping the accessory to one of the angle bars or in a longitudinal groove defined by the spaces between the fins and angle bars. The cruciform beam is relatively strong in resisting buckling when torsion is applied to the beam around an axis orthogonal to the long axis of the cruciform beam because in cross-section, a substantial amount of the beam material is distant from the center longitudinal axis. Such torsion occurs when the cruciform beam spans a space and a load is attached to the beam somewhere in the middle. However, the cruciform beam is not relatively strong when torsion is applied around the long axis of the cruciform beam. Such torsion occurs when a load is cantilevered from the side of the cruciform beam. Since a cruciform beam for a given size and weight does not have good resistance to torsion around its long axis, accessories are usually not cantilevered from the side of the cruciform beam.

What is needed is a modular building system with a beam that has strong resistance to torsion around its long axis.

BRIEF DESCRIPTION OF THE DRAWINGS

The present invention will be described by way of exemplary embodiments, but not limitations, illustrated in the accompanying drawings in which like references denote similar elements, and in which:

The accompanying drawings, which are incorporated into and constitute a part of this specification, illustrate one or more embodiments of the invention and, together with the detailed description, serve to explain the principles and implementations of the invention.

FIG. 7 is a perspective view of an application using quad-beams.

FIG. 9A shows a fourth embodiment of a quad-beam in a perspective view.

FIG. 10A shows a top view of a first embodiment of a dual quad-beam assembly.

FIG. 10B shows a perspective view of a dual beam brace bracket.

FIG. 11A shows a perspective view of a second embodiment of a dual quad-beam assembly.

FIG. 14A shows a perspective view of a dual quad-beam assembly with cantilevered legs attached, forming a first exemplary workstation arrangement.

FIG. 14B shows a top view of the leg mounting plate.

FIG. 15 shows a top view of a second exemplary workstation arrangement using dual quad-beam assemblies.

FIG. 19A shows a side view of the third exemplary workstation arrangement with a cable trough and a shelf coupled thereto.

FIG. 19B shows a perspective view of the cable trough of FIG. 19A.

FIG. 20 shows a perspective view of an adjustable end bracket.

FIGS. 29A, 29B, and 29C respectively show top, front, and side views of an arm bracket.

FIG. 34 shows cable cradles for use with the quad-rail beam or the rail-arm-leg assembly.

DETAILED DESCRIPTION

Before beginning a detailed description of the subject invention, mention of the following is in order. When appropriate, like reference materials and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Use of directional terms such as "upper," "lower," "above," "below", "in front of," "behind," etc. are intended to describe the positions and/or orientations of various components of the invention relative to one another as shown in the various Figures and are not intended to impose limitations on any position and/or orientation of any embodiment of the invention relative to any reference point external to the reference.

Those skilled in the art will recognize that numerous modifications and changes may be made to the exemplary embodiment(s) without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the exemplary embodiment(s) is essential. Other embodiments are possible, their specific designs depending upon the particular application. As such, the scope of the invention should not be limited by the particular embodiments herein described but should be defined only by the appended claims and equivalents thereof.

Quad-Beam

First Exemplary Embodiment

Figure 1:
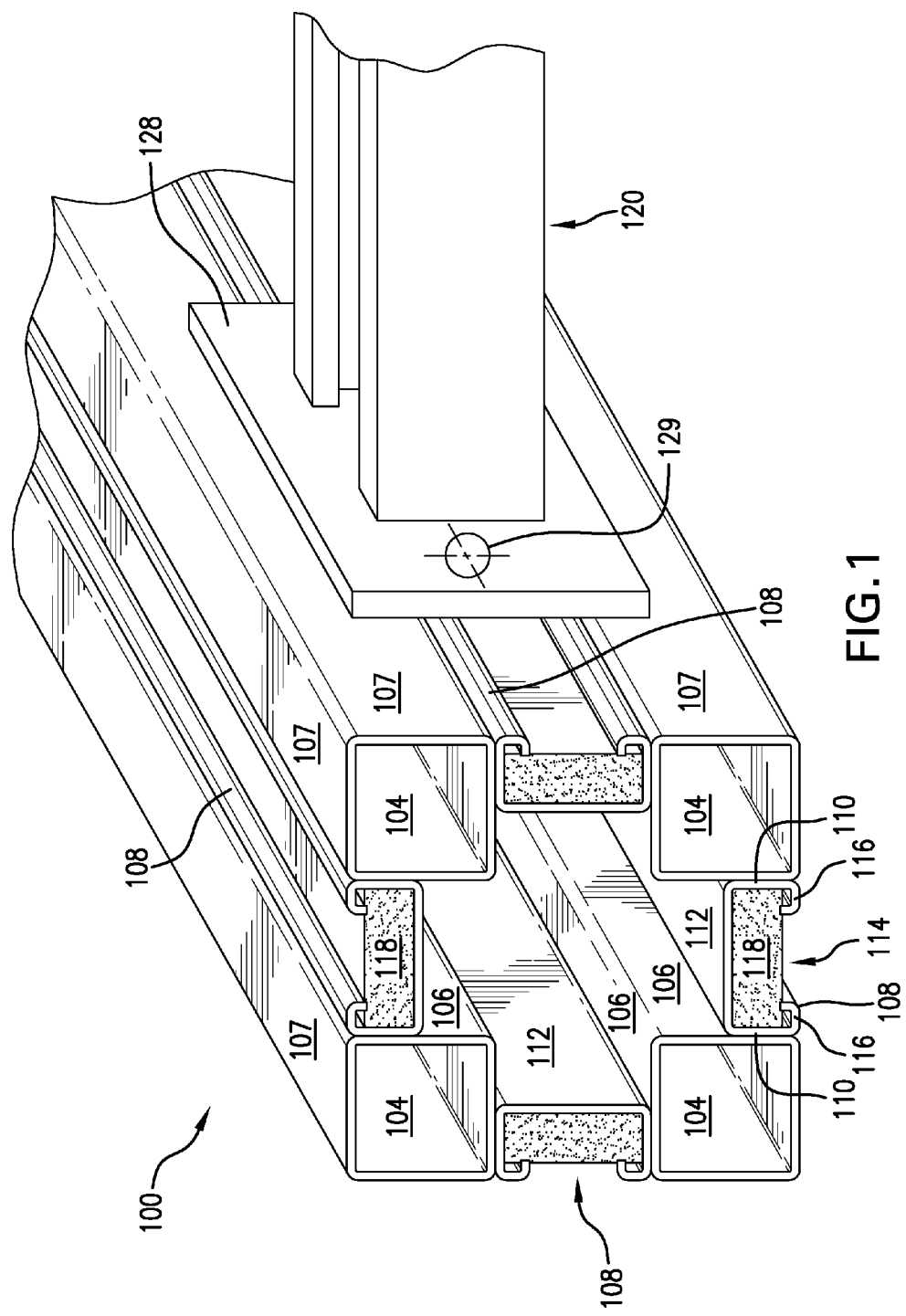
FIG. 1 is a perspective view of a first embodiment of a quad-beam.

FIG. 1 is a perspective view of a first embodiment of a quad-beam 100. Typically, the quad-beam 100 would have an end cap, but this is omitted in FIG. 1 to better illustrate the cross-sectional structure of the first embodiment quad-beam 100. The first embodiment quad-beam 100 has four corner tubes 104. The corner tubes 104 are much greater in length than in width, typically 20 or more inches in length and one to two inches in width. The corner tubes 104 are arranged in parallel longitudinally and in a rectangular pattern in cross-section. The corner tubes 104 in the first embodiment quad-beam 100 are made of steel in 12, 14, or 16 gauges, however in other embodiments, other suitable materials may be used. The corner tubes 104 have interior sides 106 that face inward towards the other corner tubes 104 and have exterior sides 107 facing outward.

The first embodiment quad-beam 100 also has four channel bars 108. Each of the first embodiment channel bars 108 has two lateral sides 110 and a back side 112. Collectively, the lateral sides 110 and the back side 112 define a channel bar cavity 114 therein. Each corner tube 104 is coupled to two of the other corner tubes 104 by one of the channel bars 108 with each lateral side 110 of each of the channel bars 108 contacting one of the interior sides 106 of one of the corner tubes 104. In the first embodiment, the channel bars 108 are made of steel and welded to the corner tubes 104, but in other embodiments, may be made of other materials and attached in other ways.

Figure 2:
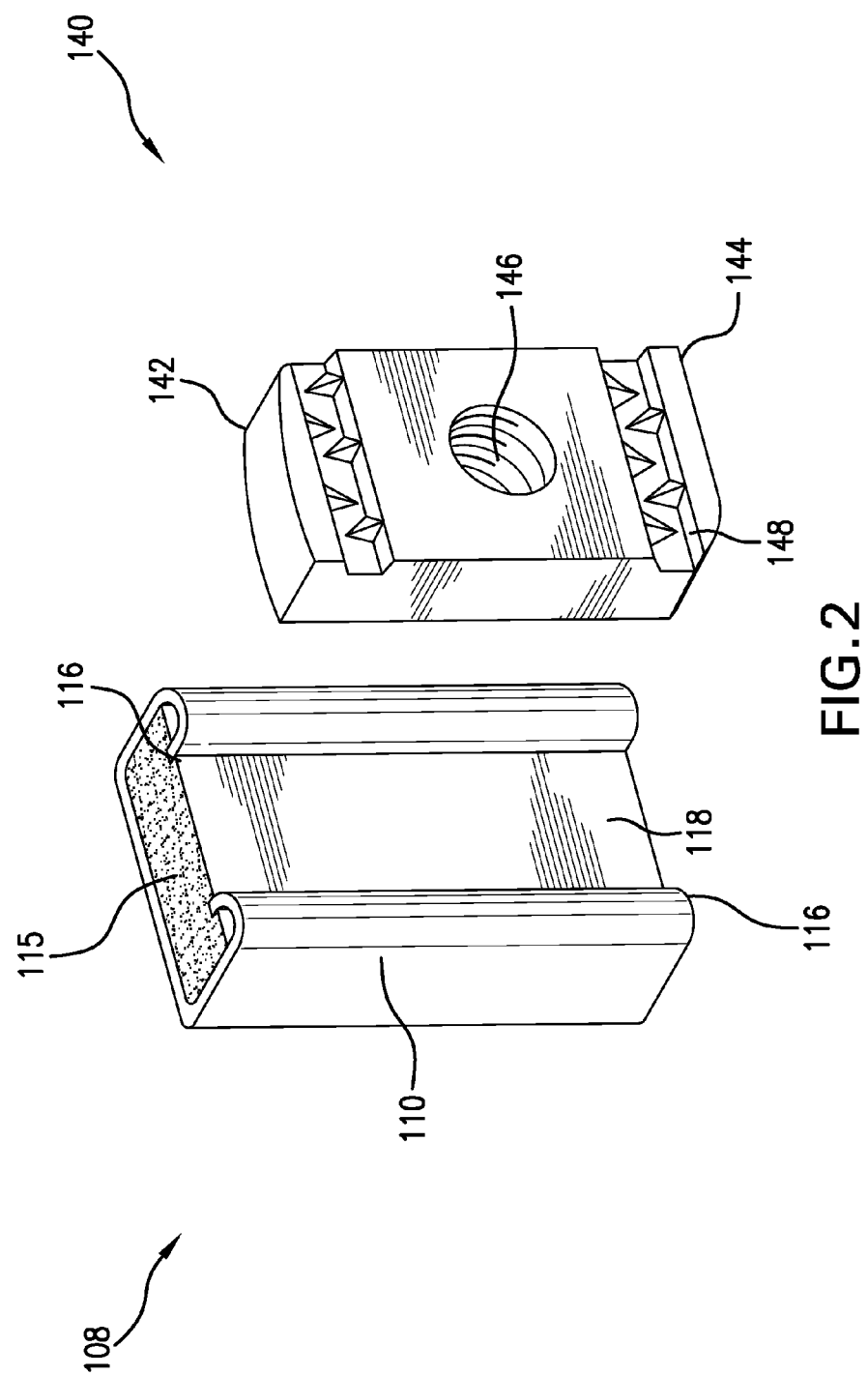
FIG. 2 is a perspective view of a strut nut and a portion of a channel leg.

FIG. 2 shows a detailed view of one of the channel bars 108 along with a strut-nut 140. The strut-nut 140 is used to attach an accessory (e.g., the single channel leg 120 in FIG. 1) to the first embodiment quad-beam 100 at the channel bar 108. Each of the channel bars 108 has channel bar lips 116 that curl in towards each other and then towards the channel bar cavity 114 and the back side 112 of the channel bar 108. The channel bar cavity 114 has nut-retention foam 118 placed therein. The channel bar 108 is configured to hold the strut-nut 140 against the curled channel bar lips 116 with the nut-retention foam 118. The channel bar 108 has a space between the channel bar lips 116 that is slightly larger than the width of the strut-nut 140. The strut-nut 140 can be inserted into the channel bar cavity 114, pushing back the nut-retention foam 118. Then the strut-nut 140 can be twisted so that the ends of the longer dimension of the strut-nut 140 slip under the channel bar lips 116. The strut-nut 140 has a pair of toothed grooves 148 near the ends of its longer dimension that are configured to engage with the channel bar lips 116. The strut-nut 140 has two rounded corners 142, diagonally opposed and two angled corners 144, diagonally opposed. The longer dimension of the strut-nut 140 is configured to be slightly shorter than the interior width of the channel bar cavity 114. When the strut-nut 140 is twisted clockwise, the rounded corners 142 slide past the interior lateral walls of the channel bar 108 until the angled corners 144 contact the channel bar lateral side 110, preventing further clockwise rotation of the strut-nut 140. The strut-nut 140 also has a threaded hole 146 configured to accept a threaded rod, bolt or screw, which is used to attach an accessory (such as the single channel leg 120) to the first embodiment quad-beam 100.

In the first embodiment, the corner tubes 104 are square in cross-section, but in other embodiments may be rectangular. A rectangular cross-section provides flat corner tube interior sides 106 for joining with the flat lateral sides 110 of the channel bars 108. The rectangular cross-section provides a flat surface for accommodating accessory parts (e.g., the single channel leg 120 in FIG. 1). This allows the accessory parts to have large flat end plates (e.g. the single channel leg end plate 128 in FIG. 1) for contacting the corner tubes 104. Large flat end plates facilitate transmittal of torque from the accessory to the first embodiment quad-beam 100. Such torque would occur if the accessory is cantilevered off of the quad-beam 100. Any torque placed on the accessory will transmit the torque forces mostly through the leg end plate 128 to the corner tubes 104 and not as much through the hardware (i.e., the bolt, strut-nut 140, and channel bar lips 116) attaching the accessory to the quad-beam 100. Torsion transmitted solely through the strut-nut 140 would tend to unseat the strut-nut 140 from one of the channel bar lips 116 and double the stress on the other channel bar lip 116. This would reduce the torque that could be safely handled by the quad-beam 100 and accessory combination.

In the first embodiment, the channel bar lips 116 are flush or nearly flush with the exterior sides 107 of the corner tubes 104. This is to facilitate the coupling of accessories, which is more difficult when the channel bar 108 is recessed. The channel bar lateral sides 110 are just long enough to provide sufficient depth in the channel bar cavity 114 for insertion of a strut-nut 140. This keeps the channel bar back side 112 close to the exterior of the quad-beam 100, as defined by the exterior sides 107 of the adjacent corner tubes 104. The channel bar back sides 112 bear forces caused by torsion of the quad-beam 100 about its long axis and will do so more efficiently when they are closer to the exterior of the quad-beam 100. In the first embodiment, the channel bar lateral sides 110 in cross-section are no greater in length than the corner tube interior sides 106 with which they are in contact. More specifically, the channel bar lateral sides 110 in cross-section are half or less in length than the corner tube interior sides 106 with which they are in contact. In the first embodiment, the corner tubes 104 are square in cross-section with corner tube interior sides 106 of 1½ inches and the channel bar lateral sides 110 are ¾ inches.

Quad-Beam

Second Exemplary Embodiment

Figure 3:
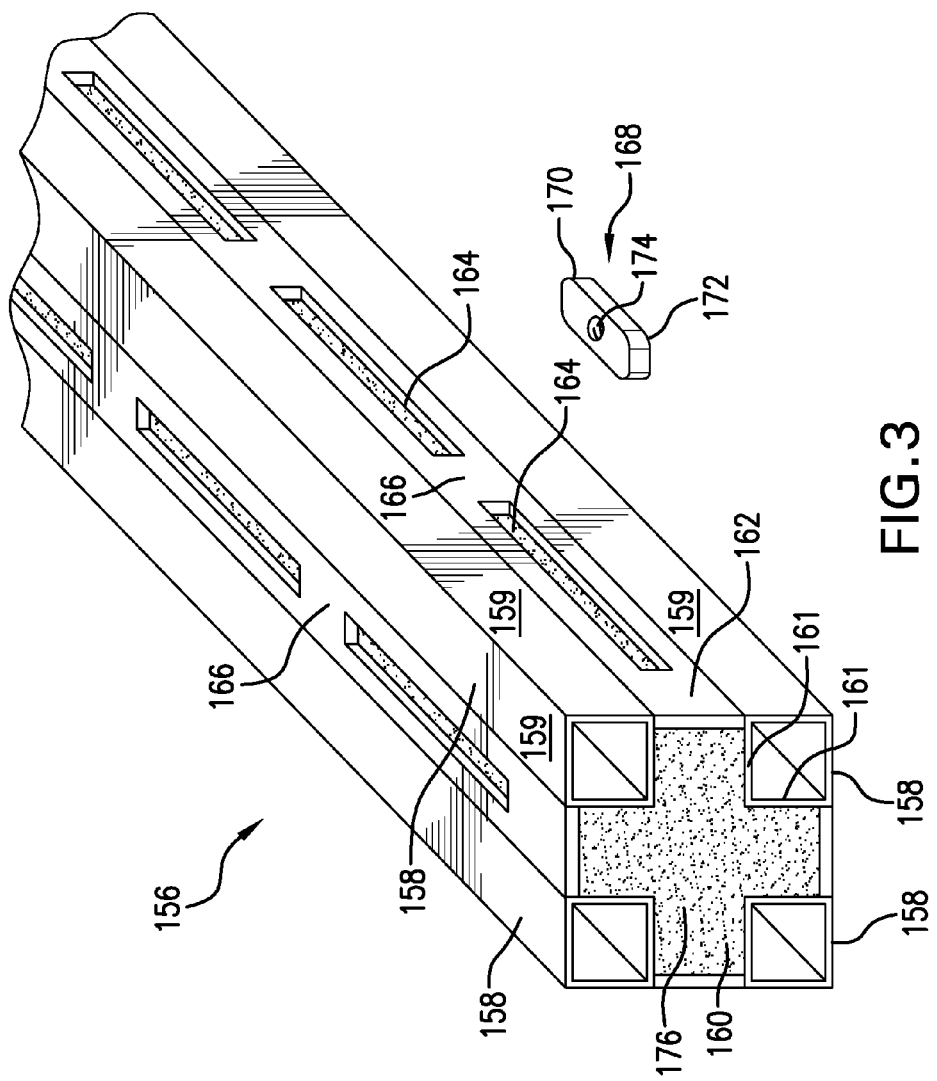
FIG. 3 is a perspective view of a second embodiment of a quad-beam.

FIG. 3 shows a second embodiment of a quad-beam 156 and a jam nut 168 intended for use therewith. Similar to the first embodiment quad-beam 100, the second embodiment quad-beam 156 has four corner tubes 158 that are rectangular in cross-section and arranged in a rectangular pattern in cross-section. The corner tubes 158 have interior sides 161 that face inward towards the other corner tubes 158 and have exterior sides 159 facing outward. However, instead of channel bars, these four corner tubes 158 are coupled by side plates 162. In the second embodiment, each side plate 162 is coupled to an adjacent two of the corner tubes 158 to be flush with the exterior sides 159 of the adjacent two corner tubes 158. In other embodiments, the adjacent corner tubes 158 are nearly flush with the exterior sides 159 of the two adjacent corner tubes 158, with each of the side plates 162 in cross-section no farther from one of the exterior sides 159 than a half of a length in cross-section of an adjacent one of the interior sides 161. The side plates 162 bear the torsion forces generated when a torque is applied to the quad-beam 156 about its long axis. In the second embodiment, the side plates 162 are coupled to the corner tubes 158 by welding, but in other embodiments, may be coupled in other ways. In some embodiments, the second embodiment quad-beam 156 is extruded as a monolithic piece.

The corner tubes 158 in the second embodiment quad-beam 156 are made of steel in 12, 14, or 16 gauges. The side plates 162 are made of 14-gauge steel. However, in other embodiments, other suitable materials may be used for the corner tubes 158 and side plates 162. In a cross-section of the second embodiment quad-beam 156, the corner tubes 158 are 1½ inches on each side and the side plates 162 are 1½ inches wide. However, in other embodiments, the corner tubes 158 and side plates 162 may have other dimensions.

The side plates 162 of the second embodiment quad-beam 156 have slots 164 for insertion of the jam nut 168. The side slots 164 run along the long axis of the side plate 162, interrupted by side plate webs 166. The side plate webs 166 bear the forces caused by torsion of the second embodiment quad-beam 156 about its long axis. The side slots 164 have a width parallel to the long axis of the side plate 162 and a height orthogonal to the width. The width of each of the side slots 164 is at least as wide as the length (largest dimension) of the jam nut 168. The height of each of the side slots 164 is at least as high as the thickness (smallest dimension) of the jam nut 168. In the second embodiment, the side slots 164 are 9/16 inch-high, which is slightly larger than the 3/8-inch thickness of the jam nut 168 used to attach accessories. In other embodiments, the side slots 164 may have a different height. For example, in some embodiments, the height of the side slots 164 is at least as high as the width of the jam nut 168 intended to be used. This would allow the jam nut 168 to be inserted into one of the side slots 164 while a bolt or threaded rod is inserted into a threaded hole 174 of the jam nut 168.

Longer side slots 164 and shorter side plate webs 166 will weaken resistance of the second embodiment quad-beam 156 to torsion about its long axis, and shorter side slot 164 with longer side plate webs 166 will strengthen resistance to torsion. A trade-off must be made between the better torsion resistance of shorter side slots 164 and flexibility in attaching accessories that comes from longer side slots 164. In the second embodiment, the side slots 164 are 4 inches wide and the side plate webs 166 are 1 inch-wide, but other embodiments may have different widths for these features.

The second embodiment quad-beam 156 has a central cavity 176 defined by the corner tubes 158 and the side plates 162. The central cavity 176 has a nut-retention foam 160 positioned therein. The nut-retention foam 160 is compressible and resilient. A jam nut 168 to be inserted through one of the side slots 164 compresses the nut-retention foam 160. The resilience of the nut-retention foam 160 then holds the jam nut 168 in position.

Similar to the strut-nut 140 in the first embodiment, the purpose of the jam nut 168 is to attach accessories to the second embodiment quad-beam 156. The jam nut 168 can be inserted into the central cavity 176, pushing back the nut-retention foam 160. Then the jam nut 168 can be twisted so that the ends of the longer dimension of the jam nut 168 slip behind the side plate 162. The jam nut 168 has two rounded corners 170, diagonally opposed and two angled corners 172, diagonally opposed. The longer dimension of the jam nut 168 is configured to be slightly shorter than the width of the side plate 162, where the width refers to the dimension between the corner tubes 158. When the jam nut 168 is twisted clockwise, the jam nut rounded corners 170 slide past the corner tubes 158 until the angled corners 172 contact the corner tubes 158, preventing further clockwise rotation of the jam nut 168. The jam nut 168 also has a threaded hole 174 configured to accept a threaded rod, bolt or screw, which is used to attach an accessory to the second embodiment quad-beam 156.

Quad-Beam

Third Exemplary Embodiment

Figure 8:
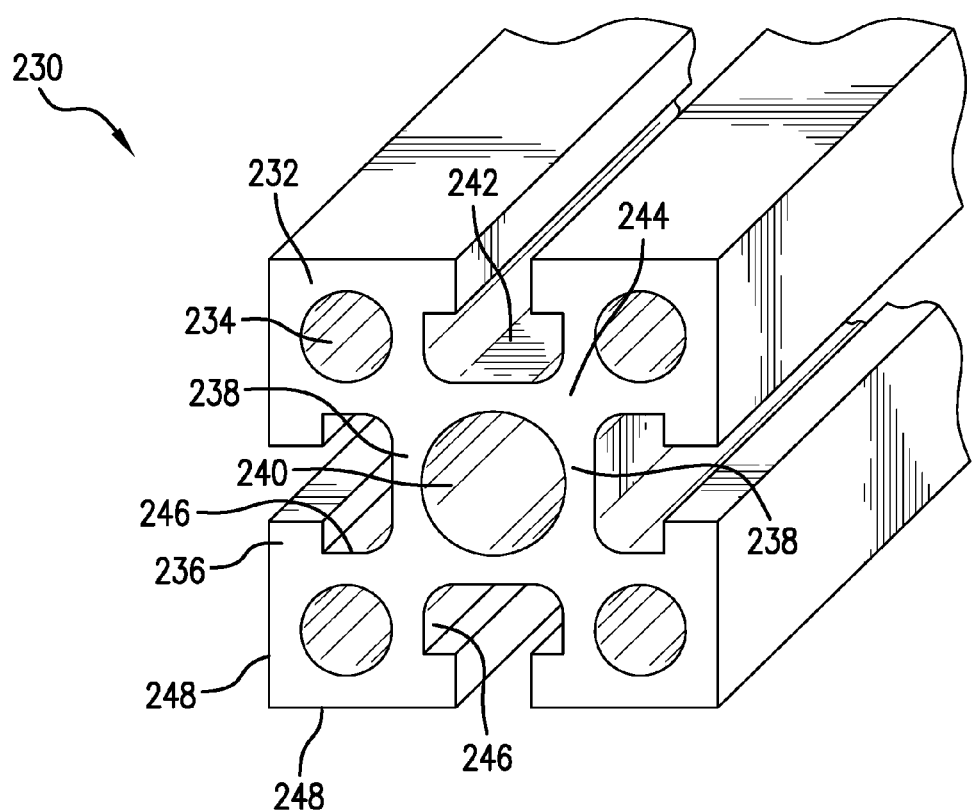
FIG. 8 shows a third embodiment of a quad-beam.

FIG. 8 shows a third embodiment of a quad-beam 230. Similar to the first embodiment quad-beam 100, the third embodiment quad-beam 230 has four corner tubes 232 arranged in a rectangular pattern in cross-section. However, instead of channel bars, these four corner tubes 232 are coupled by four corner tube webs 238. The four corner tube webs 238 define a central cavity 240. The third embodiment quad-beam 230 is more suitable for manufacturing by extrusion than the first or second embodiments, but all three embodiments may be made by various manufacturing methods without limitation.

The corner tubes 232 each have a corner tube cavity 234. The corner tubes 232 are each generally rectangular in shape in cross-section with some rounded corners, but in other embodiments may have circular cross-sections or some other suitable shape. The corner tubes 232 each have at least one exterior side 248 and at least one interior side 246. The corner tubes 232 each have two corner tube lips 236 that each project from one of the interior sides 246 of the corner tube 232 towards an adjacent corner tube 232. Each two corner tubes 232, the corner tube web 238 between them and the corner tube lips 236 adjacent this corner tube web 238, together define a channel cavity 242.

The channel cavity 242 is "T" shaped to accept a jam nut, similar to the jam nut 168 of the second embodiment. The jam nut is configured to be inserted into the channel cavity 242 with its length axis parallel to the length of the channel cavity 242, and then turned so that its length axis is parallel to the width of the channel cavity 242. With a jam nut that has a length that is the same dimension as the width of the channel cavity 242, the jam nut will jam against the corner tubes 232. The jam nut can be used to attach an accessory much in the same way as the strut—nut 140 of the first embodiment or the jam nut 168 of the second embodiment.

Each of the four corner tubes 232 has a corner tube neck 244 projecting from the corner tube 232 towards the center of the rectangular pattern of corner tubes 232. Each corner tube neck 244 connects that corner tube 232 with the two closest corner tube webs 238. Each corner tube neck 244 is relatively thick to facilitate transmittal of torsion force from an adjacent corner tube 232 to the adjacent corner tube webs 238 without undue bending or deformation of the corner tube neck 244. If the corner tube neck 244 is too thin, an accessory cantilevered off of the third embodiment quad-beam 230 and attached with a jam nut in one of the channel cavities 242 would bend the corner tube 232 above the channel cavity 242 back and away from the channel cavity 242, potentially unseating and releasing the jam nut. To prevent this, each of corner tube necks 244 is at least as thick as half the distance between the adjacent corner tube cavity 234 and the central cavity 240.

To facilitate transmittal of torque about the long axis of the third embodiment quad-beam 230 without undue twisting, the corner tube webs 238 are relatively thick and as close to the outer edge of the third embodiment quad-beam 230 as possible. Each corner tube web 238 is at least as thick as half one of the adjacent corner tube necks 244. Each corner tube web 238 is at least closer to the outer edges of the third embodiment quad-beam 230 than to a center of the central cavity 240. Stated differently, each corner tube web 238 is at least closer to one of the exterior sides 248 one of the corner tubes 232 than to a center of the central cavity 240.

Basic Assemblies and Accessories Using Quad-Beams

Figure 4A:
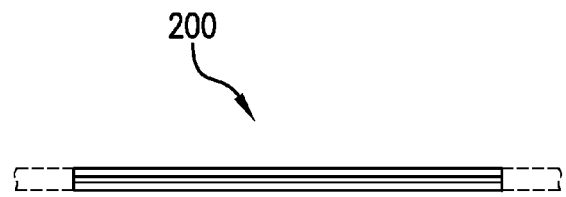
FIG. 4a is a top view of a straight configuration quad-beam.
Figure 4B:
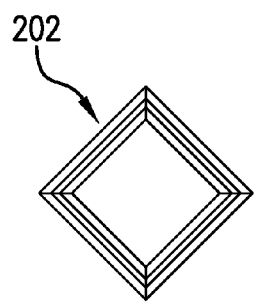
FIG. 4b is a top view of a diamond configuration using quad-beams.
Figure 4C:
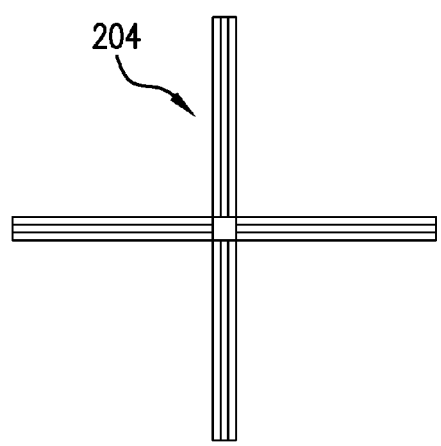
FIG. 4c is a top view of a cross configuration using quad-beams.
Figure 4D:
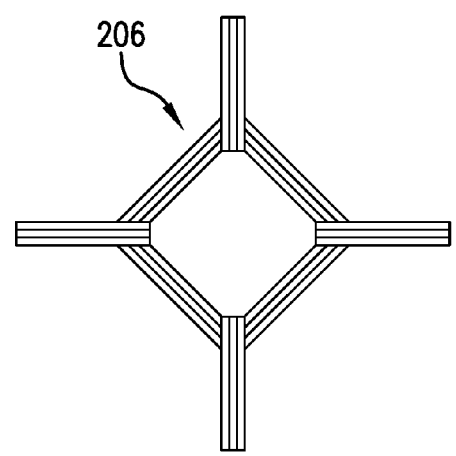
FIG. 4d is a top view of a star configuration using quad-beams.

FIGS. 4a-4d show four basic configurations that can be made with a quad-beam. The first embodiment quad-beam 100 is used in FIGS. 4a-4d, but second embodiment quad-beam 156 may be used or any other embodiment of quad-beam consistent with the teachings herein. FIG. 4a shows a straight configuration 200, which is just a single quad-beam. FIG. 4b shows a diamond configuration 202, in which the mitered ends of 4 quad-beams are joined. FIG. 4c shows a cross configuration 204, in which the ends of 4 quad-beams are joined at a central junction point. FIG. 4d shows a star configuration 206, in which is like the diamond configuration 202 except that it has 4 additional side beams, one in each junction between the mitered ends of the quad-beams in the diamond.

Figure 5A:
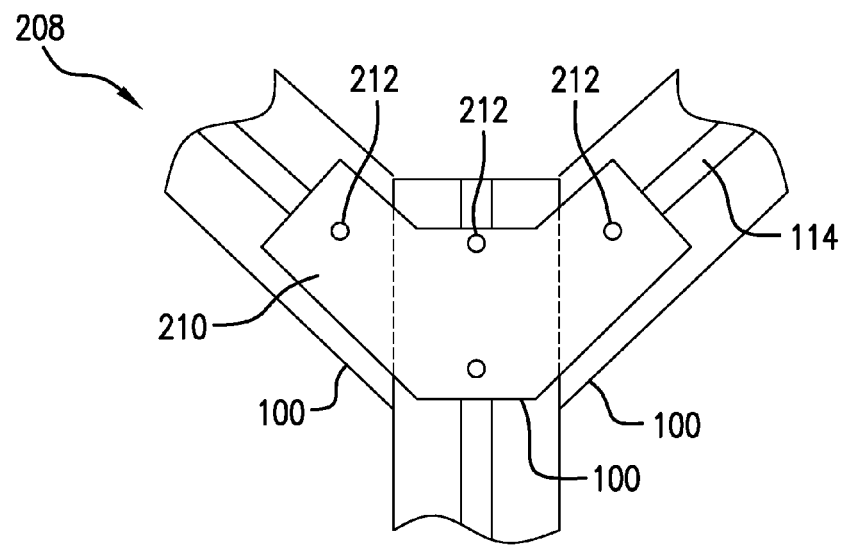
FIG. 5a is a top view of a joint in the star configuration.
Figure 5B:
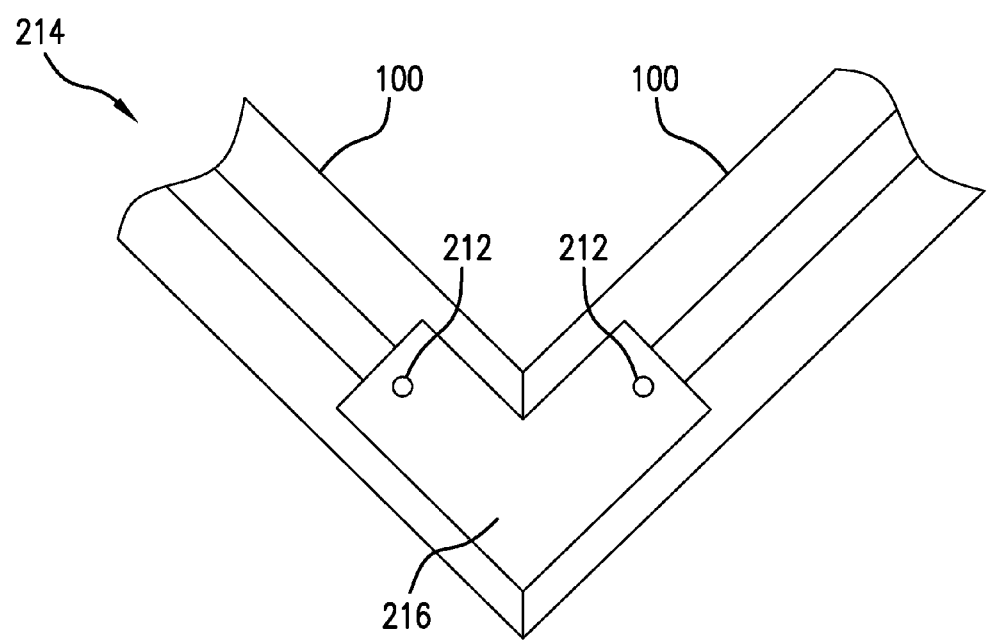
FIG. 5b is a top view of a joint in the diamond configuration.

FIG. 5a shows a star joint 208 in the star configuration 206. Three first embodiment quad-beams 100 are joined by a star joint plate 210. The star joint plate 210 is joined to the channel bar cavities 114 of the quad-beams 100 with threaded bolts 212. FIG. 5b shows a diamond joint 214 in the diamond configuration 202. Two first embodiment quad-beams 100 are joined by a diamond joint plate 216. The diamond joint plate 216 is joined to the channel bar cavities 114 of the quad-beams 100 with threaded bolts 212.

Figure 6A:
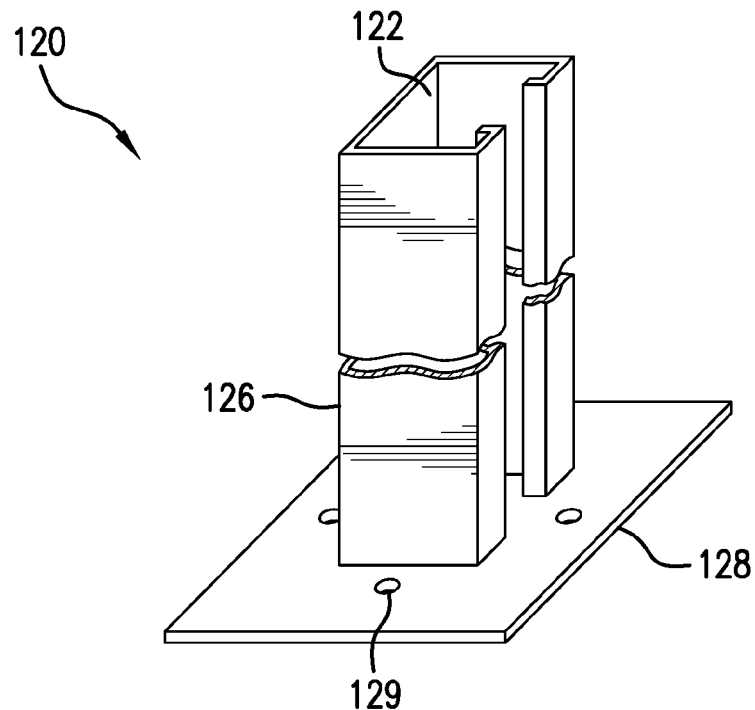
FIG. 6a is a perspective view of a single channel leg.
Figure 6B:
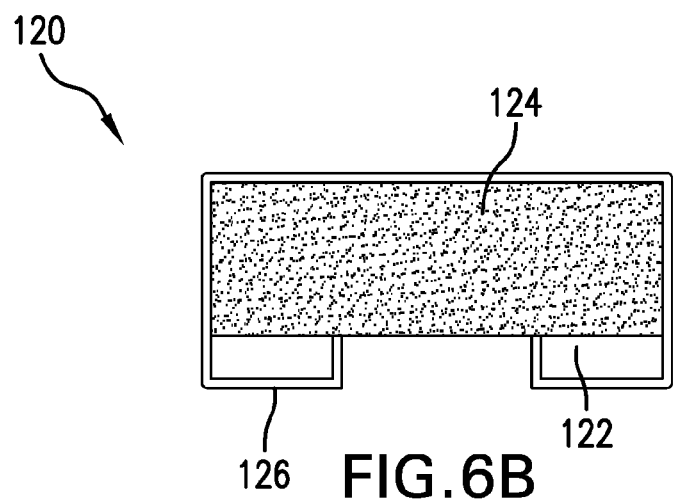
FIG. 6b is a cross-section view of a single channel leg from the top.

One type of accessory that can be joined to a quad-beam is a channel leg. FIGS. 6a-6d show several embodiments of channel legs. FIG. 6a is a perspective view of a single channel leg 120 and FIG. 6b is a cross-section view of a single channel leg 120 from the top. The single channel leg 120 has a leg body 126 and a leg end plate 128. The leg body 126 comprises a "C" type channel. The leg end plate 128 is joined to one end of the leg body 126 and has one or more bolt holes 129. The bolt holes 129 allow the single channel leg 120 to be attached to a quad-beam with a threaded bolt and a nut that jams in the quad-beam, such as a strut-nut 140 or jam nut 168. The single channel leg 120 has a leg cavity 122. In some embodiments, such as the embodiment shown in FIG. 6b, the single channel leg 120 has nut-retention foam 124 positioned therein, which makes it possible to attach other accessories to the single channel leg 120 in the same manner as they are attached to the quad-beam. However, the single channel leg 120 is not as resistant to torsion about its long axis as is a quad-beam, so it will not be able to cantilever as much load as a quad-track of similar size. In other embodiments, such as the embodiment shown FIG. 6a, the single channel leg 120 does not have any nut-retention foam.

Figure 6C:
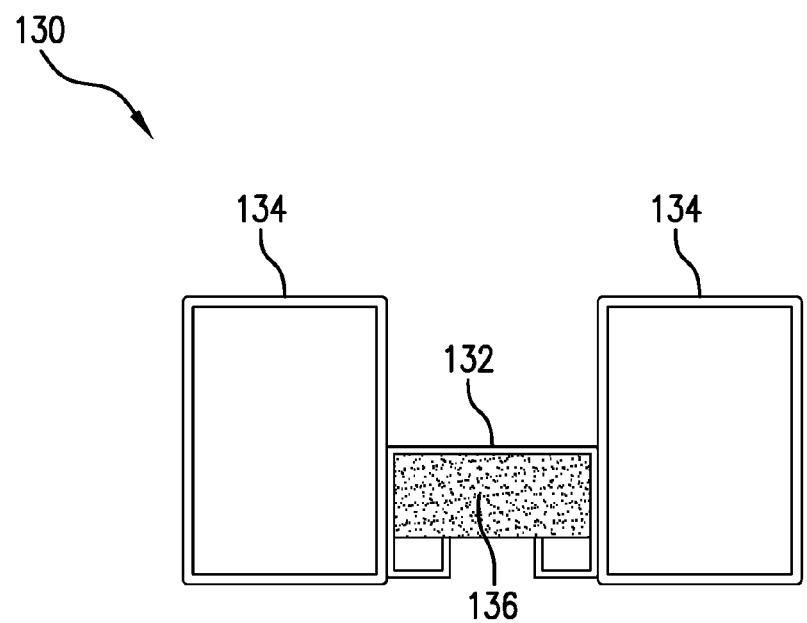
FIG. 6c is a cross-section view of an alternative single channel leg from the top.

FIG. 6c is a cross-section view of an alternative single channel leg 130. The alternative single channel leg 130 has a leg channel 132 bracketed by two leg tubes 134. The leg channel 132 has nut-retention foam 136 positioned therein, but may be omitted in some embodiments. The alternative single channel leg 130 has an end plate (not shown) similar to the leg end plate 128 in FIG. 6a.

Figure 6D:
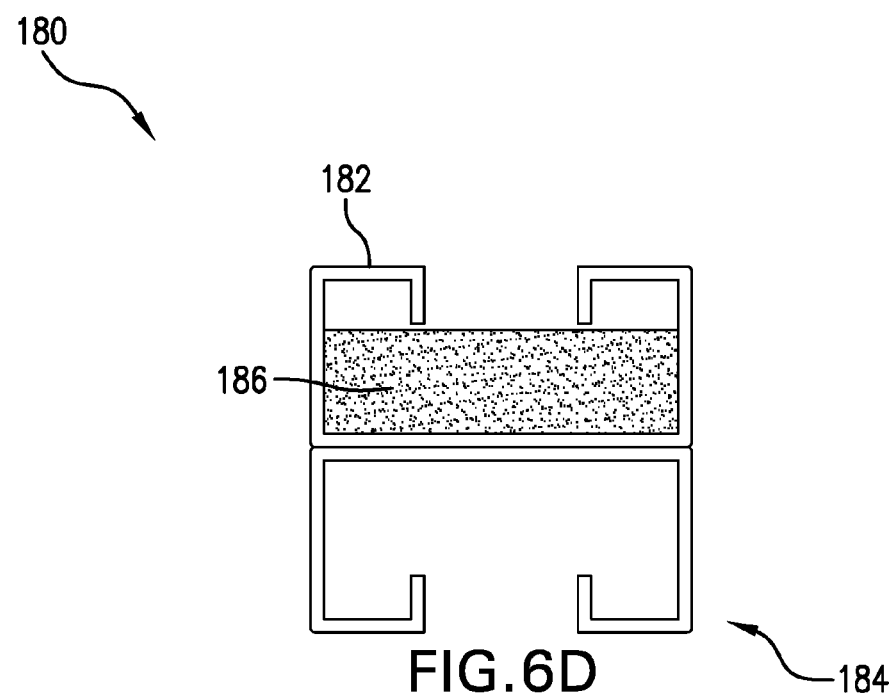
FIG. 6d is a cross-section view of a double channel leg from the top.

FIG. 6d is a cross-section view of a double channel leg 180. The double channel leg 180 has a front channel 182 and a back channel 184 that are joined back-to-back. The double channel leg 180 has an end plate (not shown) similar to the leg end plate 128 in FIG. 6a. The double channel leg 180 has nut-retention foam 186 positioned therein, but may be omitted in some embodiments.

Workstation Assemblies Using Quad-Beams

FIG. 7 shows a first application using quad-beams. First embodiment quad-beams 100 are used, but second embodiment quad-beams 156 or other embodiments of the quad-beam could be used. A first embodiment quad-beam 100 is supported by two single channel legs 120 attached thereto. A first side extension 220 and a second side extension 222 are attached to the quad-beam 100 using gusset plates 224, threaded bolts 212 and strut-nuts 140. The first side extension 220 has a single channel leg 120 to support its far end, but the second side extension 222 does not and is cantilevered. Due to the attachment mechanism described herein, the side extensions can be moved laterally after loosening the appropriate threaded bolts 212. When in the desired position, the threaded bolts 212 are tightened. Other accessories can be attached to the side extensions 220, 222 such as shelves, bins, computer pedestals and table top work surfaces. A divider 226 is attached to the first embodiment quad-beam 100 using a gusset plate 224, threaded bolts 212 and strut-nuts 140. The divider 226 is shown as cantilevered from the first embodiment quad-beam 100, but it could also be supported at the far end by a single channel leg 120.

Quad-Beam

Fourth Exemplary Embodiment

Figure 9B:
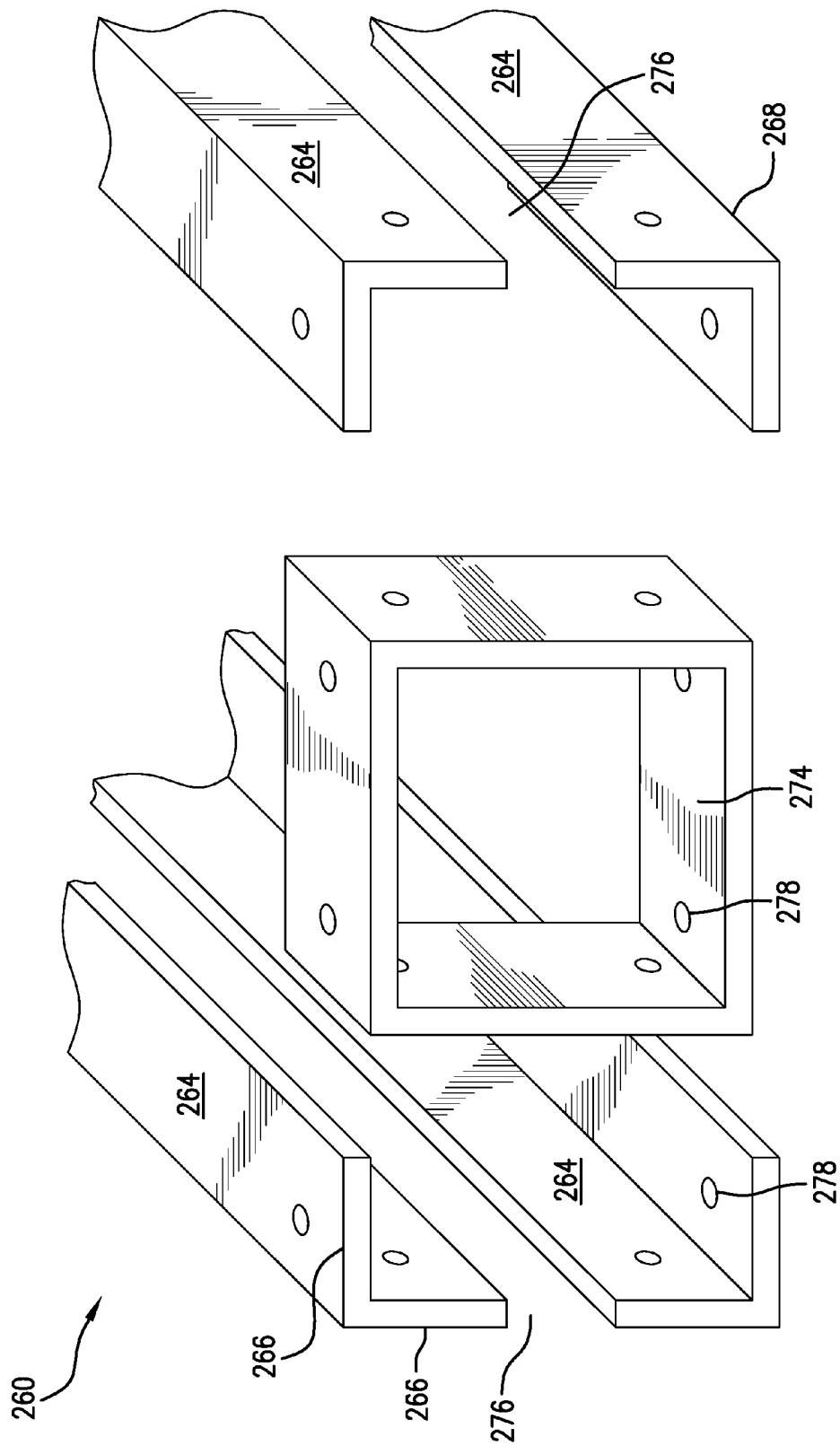
FIG. 9B shows an exploded perspective view of the fourth embodiment quad-beam.

FIGS. 9A and 9B show a fourth embodiment of a quad-beam 230. FIG. 9A shows the fourth embodiment quad-beam 260 in a perspective view. FIG. 9B shows an exploded perspective view of the fourth embodiment quad-beam 260. The fourth embodiment quad-beam 260 has four angle bars 264 arranged in parallel lengthwise. The angle bars 264 are arranged in a pattern 270 that is rectangular in cross-section. The rectangular cross-section pattern 270 has four pattern corners 272. Each of the four angle bars 264 have two legs 266 that join at an angle bar corner edge 268. The angle bar corner edge 268 of each of the four angle bars 264 is located in a different one of the four pattern corners 272. The four angle bars 264 are arranged such that there is an inter-bar gap 276 between each leg 266 and an adjacent leg 266 of an adjacent angle bar 264. The inter-bar gap 276 may serve as a track for attaching accessories or attaching the quad-beam 260 to other copies of the quad-beam 260 or to other structures.

The angle bars 264 in the fourth embodiment quad-beam 260 are made of steel ³⁄₁₆ inch thick, however in other embodiments, other suitable materials and thicknesses may be used. The angle bars 264 may be a length suitable for constructing workstations. A length of 60 inches is usually suitable, but other lengths may prove to be desirable. The angle bar legs 266 may have a suitable width, such as 1½ inches, but may have other widths. The inter-bar gap 276 may have a suitable width, such as ¾ inches, but may have other widths as well. Length and thickness of the angle bars 264 may be selected based on the situations in which the quad-beam 260 is intended to be used. Situations that will put more torsion on the quad-beam 260 may call for thicker angle iron.

In the fourth embodiment quad-beam 260, the four angle bars 264 are coupled with one or more beam mount brackets 274. Typically, there is one beam mount bracket 274 every 30 inches down the length of the quad-beam 260, but other spacing may be used. The beam mount bracket 274 is formed in a shape of a rectangular tube. Each of the four corners of the beam mount bracket 274 is nested inside of one of the four angle bars 264 and coupled thereto. The beam mount bracket 274 may be coupled to the four angle bars 264 by welding, by threaded bolts and nuts or some other suitable coupling. In FIG. 9A, the beam mount bracket 274 is shown as coupled to the four angle bars 264 by welding. In FIG. 9B, the beam mount bracket 274 and the four angle bars 264 have bolt holes for facilitating coupling with threaded bolts (not shown).

Figure 9C:
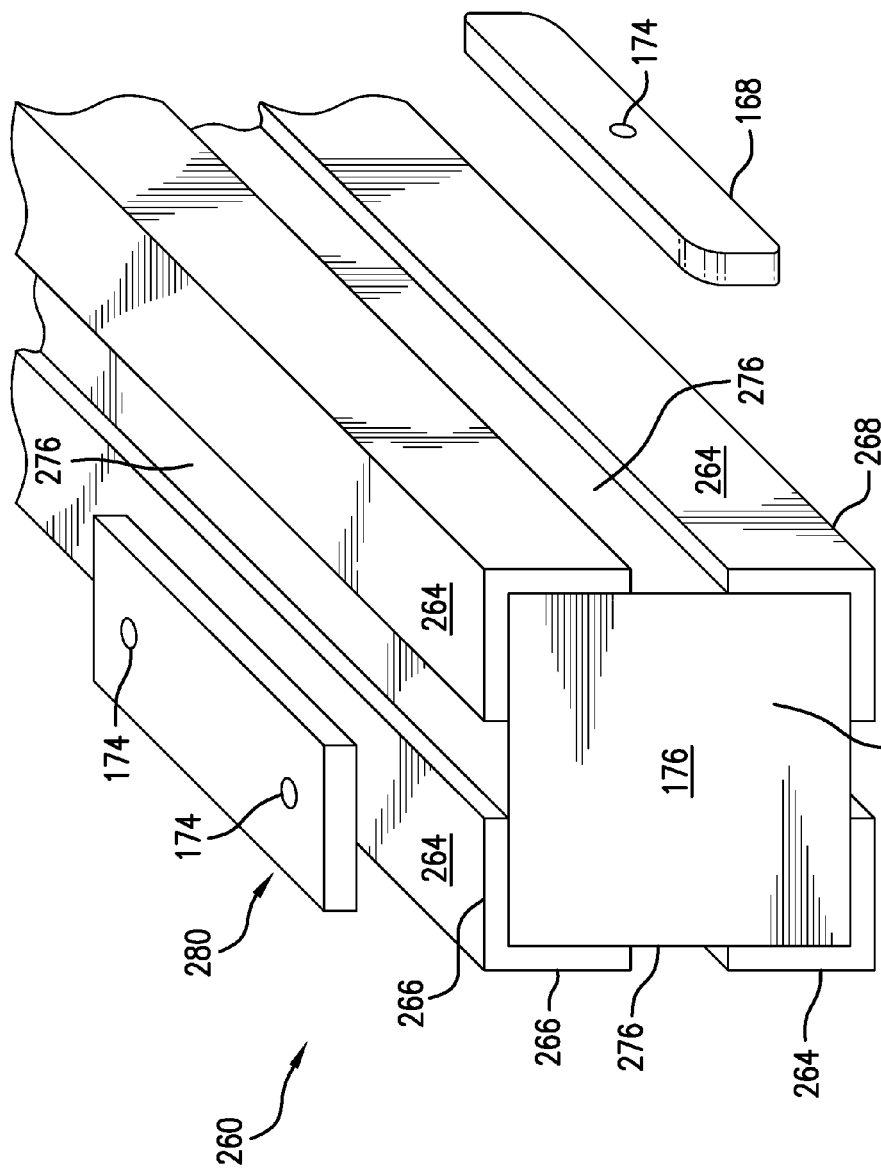
FIG. 9C shows the fourth embodiment quad-beam in a perspective view with components for attaching accessories.

FIG. 9C shows the fourth embodiment quad-beam 260 in a perspective view with components for attaching accessories. The fourth embodiment quad-beam 260 has a central cavity 176 defined by the four angle bars 264. A block of nut-retention foam 186 is positioned within the cavity. Attachment of accessories to the fourth embodiment quad-beam 260 is accomplished in a manner very similar to the second embodiment quad-beam 156. A jam nut 168 may be inserted into one of the inter-bar gaps 276 and twisted into an orientation perpendicular to the inter-bar gap 276. A bolt or threaded rod may be inserted into a threaded hole 174 of the jam nut 168 and the bolt be tightened, compressing the accessory and the jam nut 168 against the angle bars 264. A bolt plate 280 with two jam nut hole 174 may be inserted into one of the inter-bar gaps 276 in a similar manner, but without twisting. Both the jam nut 168 and the bolt plate 280 provide an extent of surface engagement with the angle bars 264 to provide a high amount of resistance to torqueing or lateral movement.

Dual Quad-Beam Assembly

First Exemplary Embodiment

FIG. 10A shows a top view of a first embodiment of a dual quad-beam assembly 262. The dual quad-beam assembly 262 provides a stronger base from which to build a work station than just a single quad-beam and also provides a second row of inter-bar gaps 276 on the same face, which can be convenient for building work stations on both sides of the dual quad-beam assembly 262. The dual quad-beam assembly 262 comprises two of the fourth embodiment quad-beams 260 coupled together with a plurality of dual beam brace brackets 282. FIG. 10B shows a perspective view of a dual beam brace bracket 282. The dual beam brace brackets 282 are coupled to the quad-beams 260 by welding, bolting or some other suitable coupling. The dual beam brace bracket 282 has bolt holes 278 in its legs for coupling with a quad-beam 260 and has bolt holes 278 in its back plate for coupling with other dual quad-beam assemblies 262 or coupling with mounting brackets for accessories.

Bolting of the dual quad-beam assembly 262 and of the constituent quad-beams 260 provides a logistical advantage as separate angle bars 264, beam mount brackets 274, and dual beam brace brackets 282 can be stored, shipped and moved more conveniently than fully assembled dual quad-beam assemblies 262. The dual quad-beam assembly 262 may be made to any convenient length. A typical configuration would be a dual quad-beam assembly 262 of 120 inches with dual beam brace brackets 282 at each end and at 30 inch intervals.

Dual Quad-Beam Assembly

Second Exemplary Embodiment

Figure 11B:
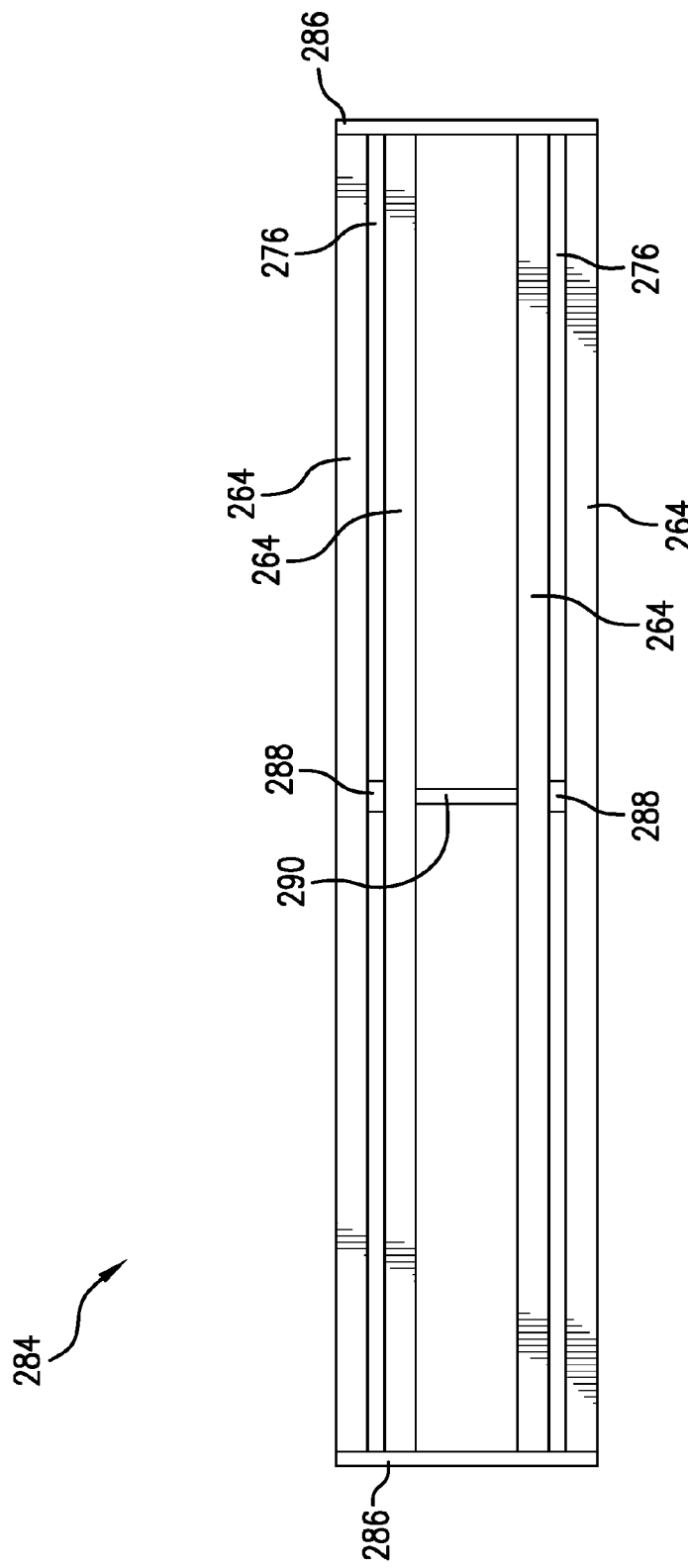
FIG. 11B shows a top view of the second embodiment of a dual quad-beam assembly.

FIGS. 11A and 11B show views of a second embodiment of a dual quad-beam assembly 284. FIG. 11A shows a perspective view of the second embodiment of a dual quad-beam assembly 284. FIG. 11B shows a top view of the second embodiment of a dual quad-beam assembly 284. The second embodiment dual quad-beam assembly 284 comprises two quad track beams made of two sets of four angle bars 264, each arranged as in the fourth embodiment quad-beam 260 as shown in FIG. 9A, but without the beam mount brackets 274. Instead, the four angle bars 264 are coupled together by quad-track end plates 286, one at each end. The quad-track end plates 286 are preferably coupled to the four angle bars 264 by welding, but bolting or some other suitable coupling may be used.

As shown in FIG. 11A, a single quad-track end plate 286 not only couples angle bars 264 of one of the quad-beams, but both. The quad-track end plates 286 have bolt holes 278 to allow one dual quad-beam assembly 284 to be coupled to another such assembly and alternatively to allow accessories to be attached. The second embodiment dual quad-beam assembly 284 has a plurality of stiffeners 288 coupled to the angle bars 264 in the inter-bar gaps 276, preferably by welding. The stiffeners 288 reinforce the quad-beam, transmitting compression force and helping maintain the size and integrity of the inter-bar gap 276 when the quad-beam is under torsion about its long axis.

Dual Quad-Beam Cruciform Module

First Exemplary Embodiment

Figure 12:
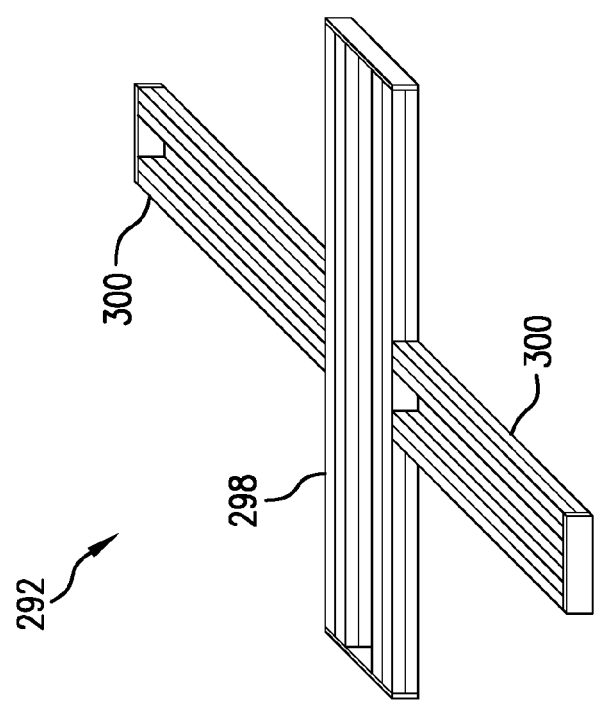
FIG. 12 shows a perspective view of a first embodiment of a dual quad-beam cruciform module.

FIG. 12 shows a perspective view of a first embodiment of a dual quad-beam cruciform module 292. The first embodiment dual quad-beam cruciform module 292 comprises a plurality of dual quad-beam assemblies coupled in a cruciform shape. The dual quad-beams assemblies used in the first embodiment dual quad-beam cruciform module 292 may be either of the first embodiment dual quad-beam assembly 262 type or of the second embodiment dual quad-beam assembly 284 type. The plurality of dual quad-beam assemblies comprises one long dual quad-beam assembly 298 and two short dual quad-beam assemblies 300. The two short dual quad-beam assemblies 300 are coupled to the long dual quad-beam 298 using sets of bolts and jam nuts, such as the jam nut 168 shown in FIG. 9C. Each set of bolts and jam nuts are inserted into one of the inter-bar gaps 276 in the long dual quad-beam 298.

Dual Quad-Beam Cruciform Module

Second Exemplary Embodiment

Figure 13A:
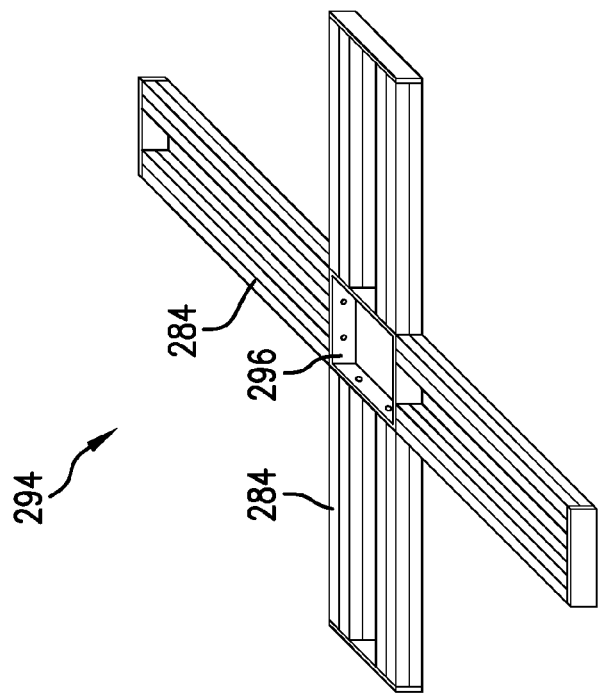
FIG. 13A shows a perspective view of a second embodiment of a dual quad-beam cruciform module.
Figure 13B:
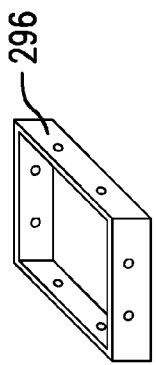
FIG. 13B shows a perspective view of a central mounting plate.

FIG. 13A shows a perspective view of a second embodiment of a dual quad-beam cruciform module 294. The second embodiment dual quad-beam cruciform module 294 has four dual quad-beam assemblies, each coupled to a central mounting plate 296. The dual quad-beams assemblies used in the first embodiment dual quad-beam cruciform module 292 may be either of the first embodiment dual quad-beam assembly 262 type or of the second embodiment dual quad-beam assembly 284 type. FIG. 13B shows a perspective view of the central mounting plate 296.

Single-Track Beam Assembly

Exemplary Embodiment

Figure 16:
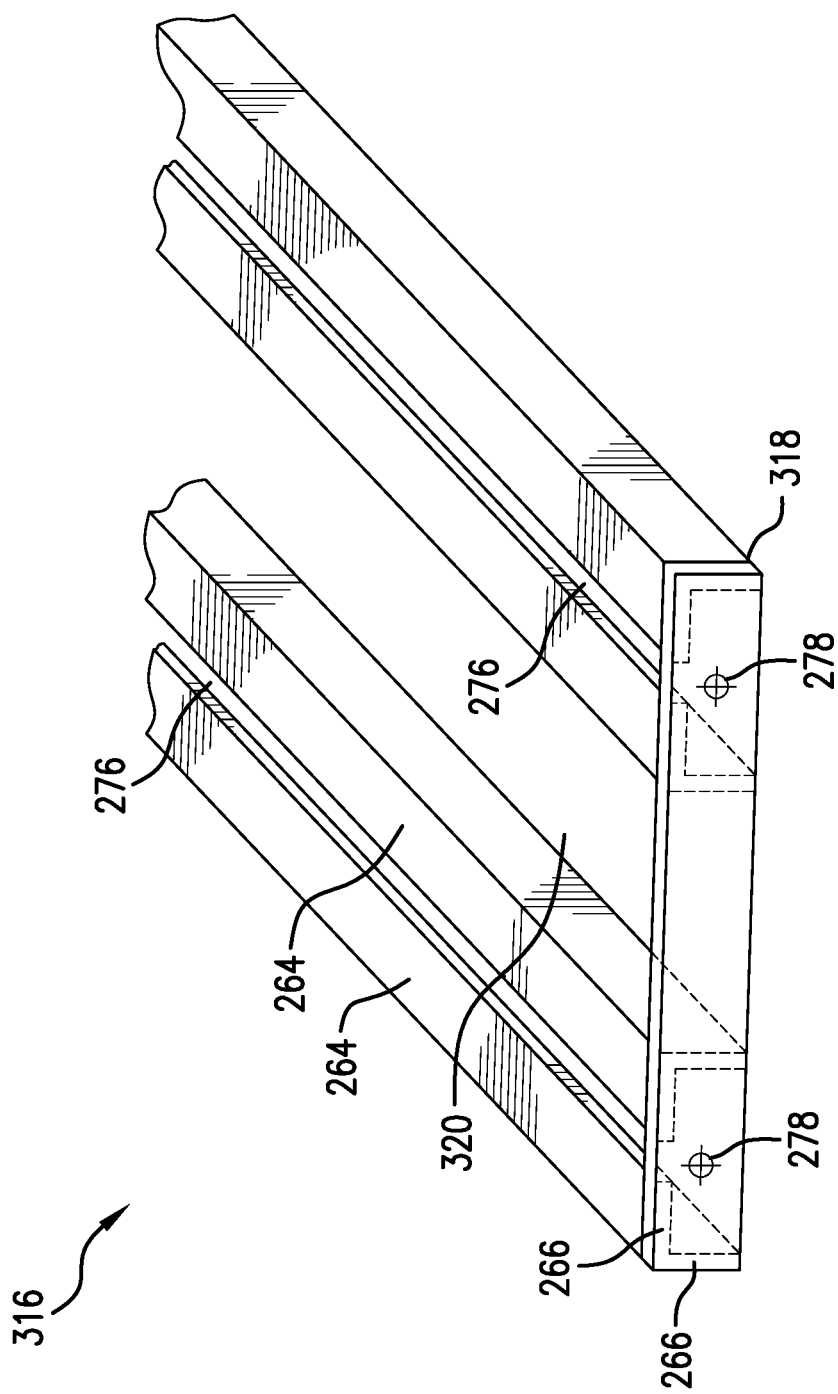
FIG. 16 shows a perspective view of an exemplary embodiment of a single-track beam assembly.

FIG. 16 shows a perspective view of an exemplary embodiment of a single-track beam assembly 316. The single-track beam assembly 316 comprises two single-track beams coupled in parallel lengthwise with an inter-beam gap 320 between them. Each of the two single track beams comprises two angle bars 264 coupled in parallel lengthwise and in a pattern that is rectangular in cross-section. The two angle bars 264 are arranged such the corner edge of each of the two angle bars 264 is in a different one of the four pattern corners and such that there is an inter-bar gap 276 between one of the legs 266 of two angle bars 264 and an adjacent one of the legs 266 of a second of the two angle bars 264. The single-track beam assembly 316 has two end plates 318, each coupled to one of the ends of the angle bars 264 of both single-track beams. The single-track end plates 318 are preferably coupled to the angle bars 264 by welding, but other couplings may be used.

The single-track beam assembly 316 may be used to provide support for mounting additional accessories to a work station. The single-track beam assembly 316 is not as strong in resisting torsion along its long axis as the quad-beams, but in situations where no such torsion loads are expected, the single-track beam assembly 316 is a lighter weight alternative. Such situations would include where accessories are only mounted vertically and not cantilevered out sideways.

Dual-Track Beam Assembly

Exemplary Embodiment

Figure 17:
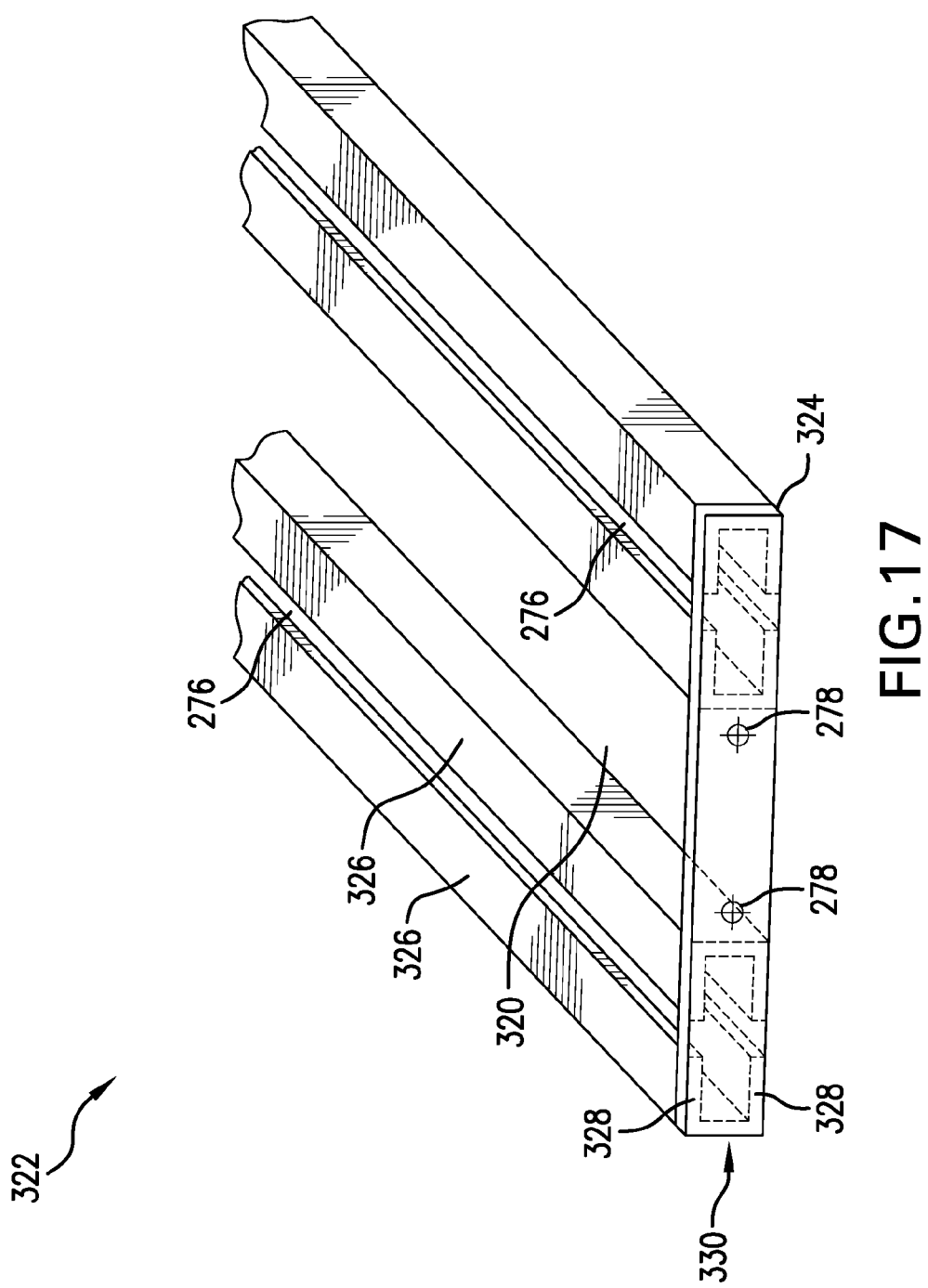
FIG. 17 shows a perspective view of an exemplary embodiment of a dual-track beam assembly.

FIG. 17 shows a perspective view of an exemplary embodiment of a dual-track beam assembly 322. The dual-track beam assembly 322 has two dual-track beams coupled in parallel lengthwise with an inter-beam gap 320 between them. Each of the two dual track beams comprises two channel bars 326 coupled in parallel lengthwise and in a pattern that is rectangular in cross-section. Each of the two channel bars has two channel bar legs 328 joined to a channel back 330. The channel back 330 of one of the two channel bars 326 is in two of the four corners of the rectangular pattern and the channel back 330 of other of the two channel bars 326 is in the other two of the four corners of the rectangular pattern. The two channel bars 326 are arranged such that for each channel bar leg 328 there is an inter-bar gap 276 between that leg and an adjacent one of the legs of the other of the two channel bars 326. The dual-track beam assembly 322 has two dual-track end plates 324 coupled to the ends of the channel bars 326 of both dual-track beams. The dual-track end plate 324 are preferably coupled to the channel bars 326 by welding, but other couplings may be used.

The dual-track beam assembly 322 may be used to provide support for mounting additional accessories to a work station. The dual-track beam assembly 322 is stronger than the single-track beam assembly 316, but not as strong as the quad-beam assemblies in resisting torsion along its long axis. However, in situations where no such torsion loads are expected, the dual-track beam assembly 322 is an intermediate weight alternative.

Dual Quad-Beam Assembly

Application Examples

FIG. 14A shows a perspective view of a dual quad-beam assembly with cantilevered legs 304 attached, forming a first exemplary workstation arrangement 308. Second embodiment dual quad-beam assemblies 284 are shown, but first embodiment dual quad-beam assembly 262 may be used as well. The cantilevered legs 304 couple to the dual quad-beam assembly 284, elevating the second embodiment dual quad-beam assembly 284 to a useful height for when work surfaces and work accessories are attached thereto. The cantilevered legs 304 each have a leg mounting plate 306 with bolt holes 278 therein. FIG. 14B shows a top view of the leg mounting plate 306. The leg mounting plate 306 is coupled to the second embodiment dual quad-beam assembly 284 using sets of bolts and jam nuts, such as the jam nut 168 shown in FIG. 9C. Each set of bolts and jam nuts are inserted into one of the inter-bar gaps 276 in the underside of dual quad-beam assembly 284. Any of the cantilevered legs 304 can be repositioned along the dual quad-beam assembly 284 by loosening of the bolts in the leg mounting plate 306, then sliding the cantilevered leg 304 forward or back along the dual quad-beam assembly 284 as indicated by the arrows.

FIG. 15 shows a top view of a second exemplary workstation arrangement 310 using dual quad-beam assemblies 284. Second embodiment dual quad-beam assemblies 284 are shown, but first embodiment dual quad-beam assembly 262 may be used as well. An accessory 312 may be coupled to one of the dual quad-beam assemblies 284 anywhere there is inter-bar gap 276 available to do so. The accessory 312 is coupled to an accessory mounting 314. The accessory mounting 314 has bolt holes 278 therein. The accessory mounting 314 couples to the dual quad-beam assembly 284 using sets of bolts and jam nuts, such as the jam nut 168 shown in FIG. 9C. Each set of bolts and jam nuts are inserted into one of the inter-bar gaps 276 in the topside of dual quad-beam assembly 284.

Figure 18:
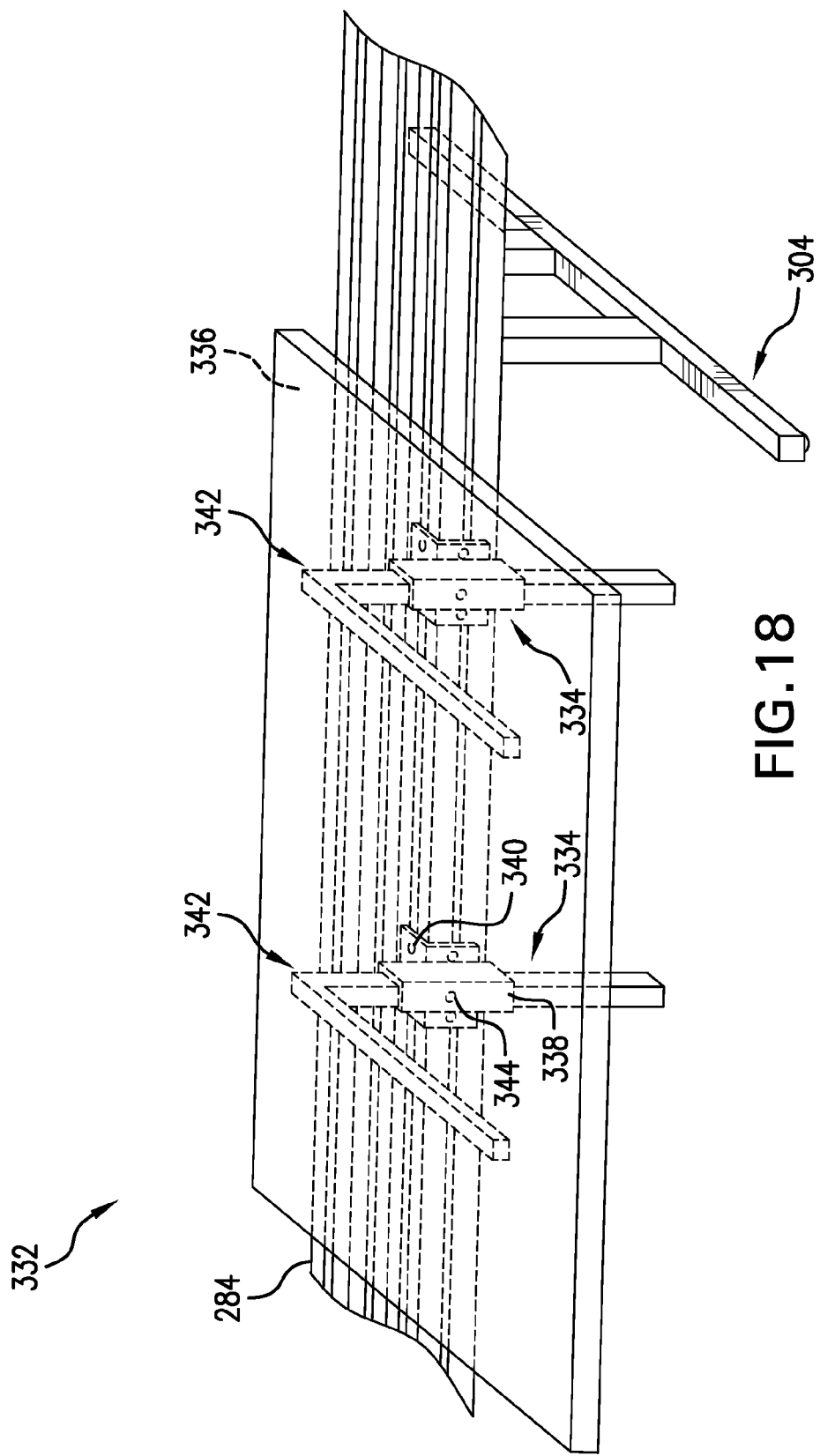
FIG. 18 shows a perspective view of a third exemplary workstation arrangement.

FIG. 18 shows a perspective view of a third exemplary workstation arrangement 332. This third exemplary workstation arrangement 332 has one or more second embodiment dual quad-beam assemblies 284 with cantilevered legs 304 attached as in the first exemplary workstation arrangement 308 as shown in FIG. 14A, but also has one or more adjustable accessory brackets 334 and a work surface 336 (shown as transparent to allow view of the adjustable accessory brackets 334).

The adjustable accessory brackets 334 each have a bracket tube 338 and a bracket mounting plate 340. The bracket mounting plate 340 couples to the dual quad-beam assembly 284 using sets of bolts and jam nuts, such as the jam nut 168 shown in FIG. 9C. The bracket tube 338 is coupled to the bracket mounting plate 340. A bracket arm 342 is inserted into and slidingly coupled with the bracket tube 338. Accessories may be mounted to the bracket arm 342, such as the work surface 336 shown. The bracket arm 342 may be moved within the bracket tube 338 to adjust the height of the accessory. Alternatively, the adjustable accessory bracket 334 may be mounted with the bracket tube 338 pointing sideways rather than vertically, in which case, the lateral position of the accessory is adjusted. The bracket arm 342 may be held in position with a set screw 344, which may be loosened to reposition the bracket arm 342 and tightened again when in the new position. The set screw 344 may have a hand knob so that the position of the bracket arm 342 can be adjusted without tools.

Bracket arm 342 shown in FIG. 18 has a right angle bend for supporting the work surface 336, but other bracket arms 342 may not have the right angle bend and may have different ways for connecting with accessories, such as pivot joints.

FIG. 19A shows a side view of the third exemplary workstation arrangement 332 with a cable trough 346 and a shelf 348 coupled thereto. The shelf 348 may be coupled to the dual quad-beam assembly 284 using sets of bolts and jam nuts. The shelf 348 may be used to hold tools, light fixtures, boxes of parts, etc. FIG. 19B shows a perspective view of the cable trough 346 with a curled lip 350 on either side. The curled lips 350 may clip into the inter-bar gap 276 of the quad-beams 260 of the dual quad-beam assembly 284 and engage with the upper edge of one of the angle bar legs 266 (see FIG. 9C). The cable trough 346 may be used to carry power and communications cables to various workstations.

FIG. 20 shows a perspective view of an adjustable end bracket 352. The adjustable end bracket 352 has an end bracket back 354 with two bracket tubes 338 attached thereto and two bracket arms 342 positioned within and slidingly coupled to the bracket tubes 338. Each of the two bracket arms 342 may be held in position with a set screw 344, which may be loosened to reposition the bracket arm 342 and tightened again when in the new position. The end bracket back 354 has one or more bolt holes 278 matching the bolt holes 278 in a quad-track end plate 286 in a second embodiment dual quad-beam assembly 284 or dual beam brace bracket 282 in a first embodiment dual quad-beam assembly 262, which allows the adjustable end bracket 352 to be coupled to one end of a first embodiment dual quad-beam assembly 262 or a second embodiment dual quad-beam assembly 284.

Figure 21:
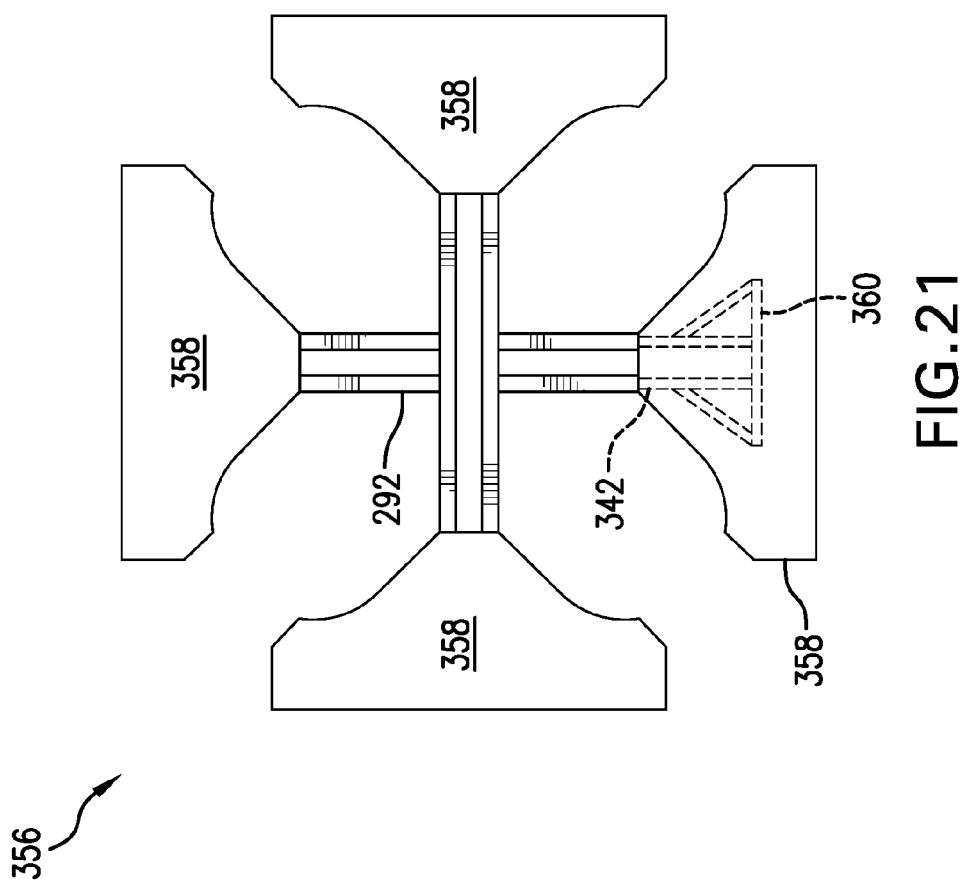
FIG. 21 shows a top view of a fourth exemplary workstation arrangement.

FIG. 21 shows a top view of a fourth exemplary workstation arrangement 356. The fourth exemplary workstation arrangement 356 comprises a first embodiment dual quad-beam cruciform module 292, although a second embodiment dual quad-beam cruciform module 294 could be used as well. The dual quad-beam cruciform module 292 has cantilevered leg 304 coupled to its underside (hidden in this drawing). An end zone work surface 358 is coupled to the end of each of the four arms of the dual quad-beam cruciform module 292 with a bracket arm 342 held by an adjustable end bracket 352. Work surface support frame 360 may be coupled to the adjustable bracket arm 342 to help support the end zone work surface 358. One worker can stand in each space between the end zone work surfaces 358 with the end zone work surface 358 used as collaborative work areas. In FIG. 21, all four end zone work surfaces 358 are shown as having the same shape, but in other arrangements, each of the end zone work surfaces 358 may have a different shape.

Figure 22:
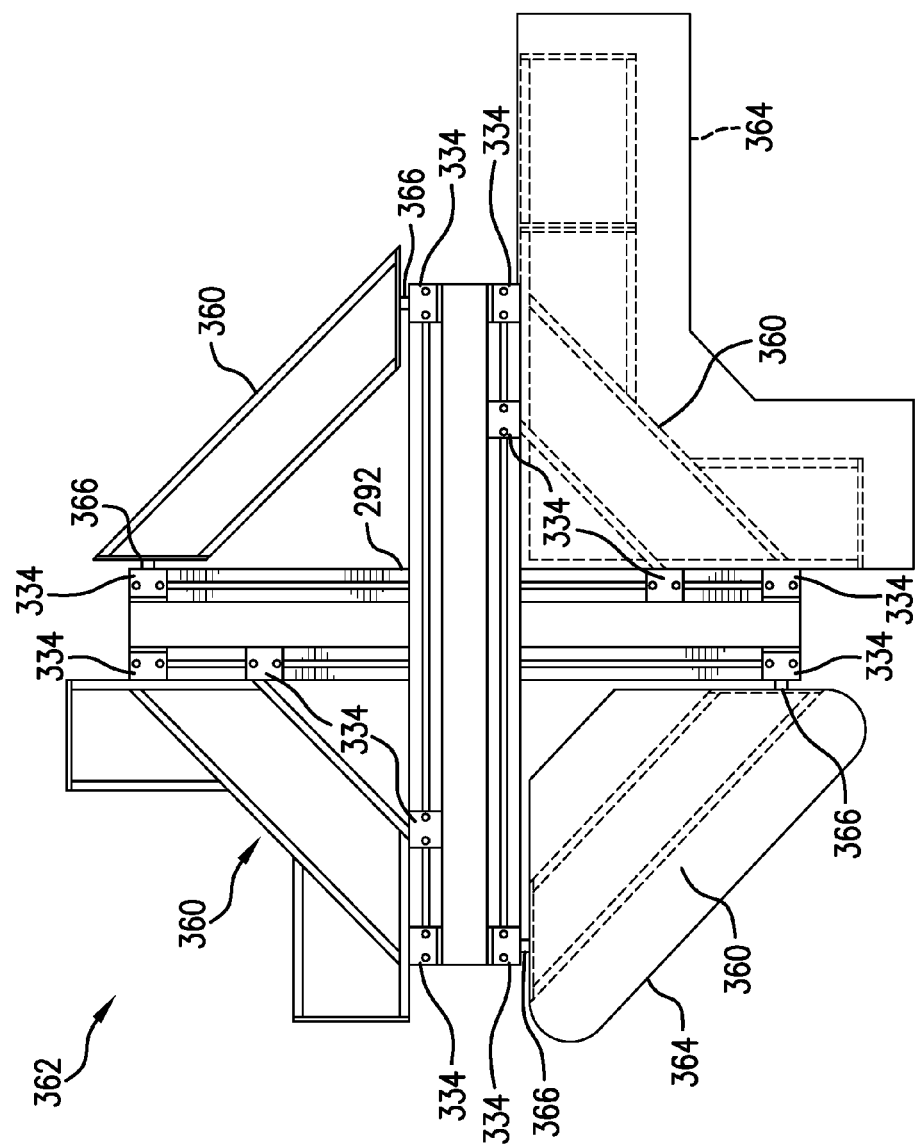
FIG. 22 shows a top view of a fifth exemplary workstation arrangement.

FIG. 22 shows a top view of a fifth exemplary workstation arrangement 362. The fifth exemplary workstation arrangement 362 comprises a first embodiment dual quad-beam cruciform module 292, although a second embodiment dual quad-beam cruciform module 294 could be used as well. The dual quad-beam cruciform module 292 has cantilevered legs 304 coupled to its underside (hidden in this drawing). Several work surfaces 364 mounted on work surface support frames 360 are coupled to the dual quad-beam cruciform module 292 with adjustable accessory brackets 334. Each of the work surface support frames 360 has bracket arms 342 that sliding couple with the respective adjustable accessory brackets 334, allowing for adjustment of the height of the work surfaces 364. Several of the bracket arms 342 have pivots 366 coupling the bracket arm 342 to the respective work surface support frame 360 and work surface 364, allowing that work surface 364 to be tilted to various angles.

Figure 23:
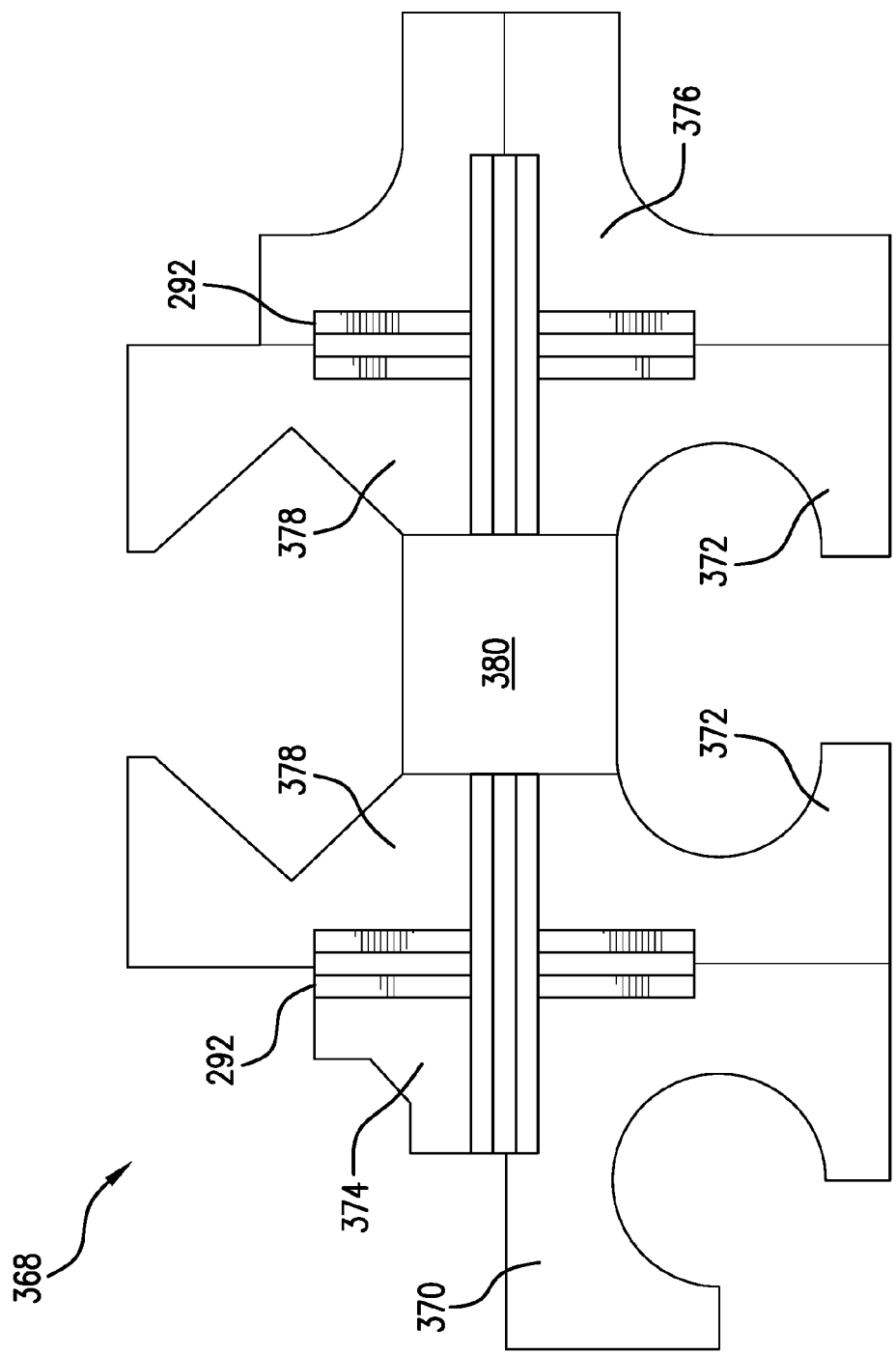
FIG. 23 shows a top view of a sixth exemplary workstation arrangement, demonstrating some of the different shaped work surfaces that may be used to create customized workstations for multiple purposes.

FIG. 23 shows a top view of a sixth exemplary workstation arrangement 368, demonstrating some of the different shaped work surfaces that may be used to create customized workstations for multiple purposes. The sixth exemplary workstation arrangement 368 comprises two first embodiment dual quad-beam cruciform modules 292, although second embodiment dual quad-beam cruciform module 294 could be used as well or a combination thereof. The dual quad-beam cruciform modules 292 have cantilevered legs 304 coupled to its underside (hidden in this drawing). Different shaped work surfaces are attached to the dual quad-beam cruciform modules 292, including a work surface with circular cutout 370, a work surface with semi-circular cutout 372, a work surface with small wing 374, a work surface with large wings 376, a work surface with triangular cutout 378, and an intermediate work surface 380. The intermediate work surface 380 couples to one of the ends of each of the two dual quad-beam cruciform modules 292, joining them together in a single unit.

Quad-Rail Beam

First Exemplary Embodiment

Figure 24:
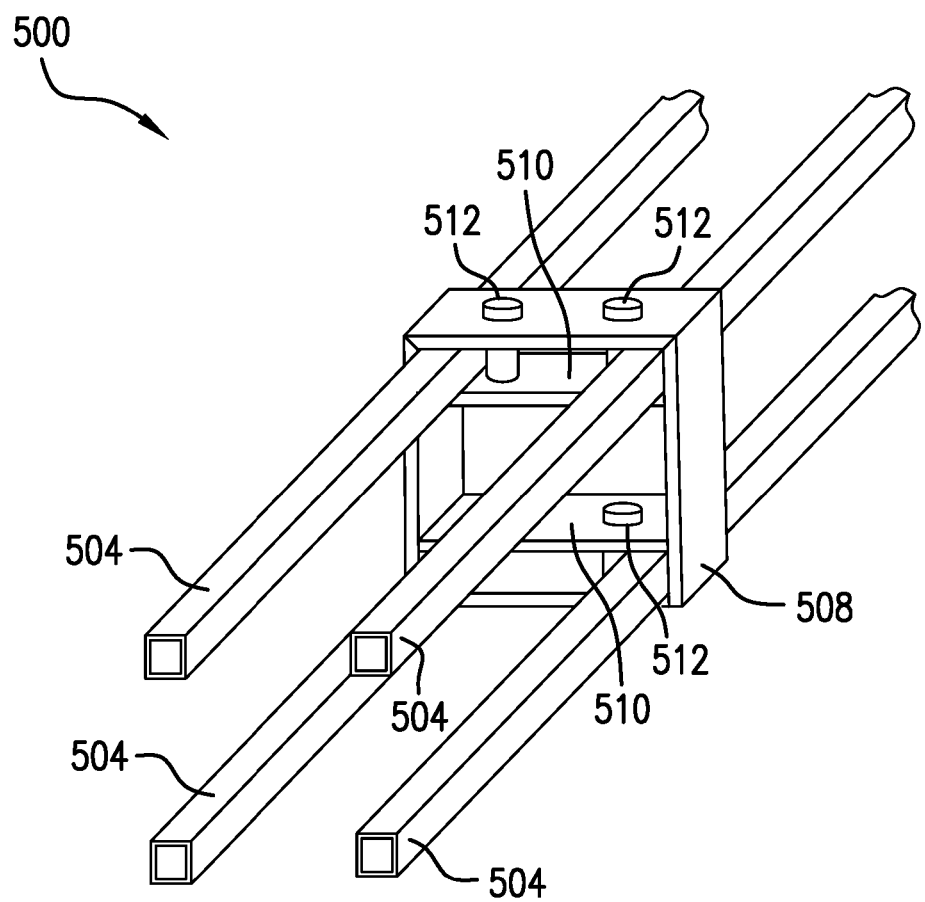
FIG. 24 shows a first exemplary embodiment of a quad-rail beam.

FIG. 24 shows a first exemplary embodiment of a quad-rail beam 500. The quad-rail beam 500 is a useful building block for building structures such as industrial work stations. The first exemplary embodiment quad-rail beam 500 comprises four rails 504 coupled by at least one peripheral binding structure such as the rail support bracket 508, clamp plate 510 and fasteners 512 shown in FIG. 24, which are configured to hold each of four rails 504 in a rectangular pattern. Each rail 504 is typically a rectangular tube, typically square in cross section, but in alternative embodiments, may have a different cross-section, such as circular. Each rail 504 is typically made of metal, such as steel, but may be made of other suitable materials. The rail support bracket 508 is typically a rectangular tube, typically square in cross section, but in alternative embodiments, may have a different cross-section. The rail support bracket 508 has a bracket interior that conforms to the rectangular pattern.

The rail support bracket 508 is typically used with at least one, or more typically, two clamp plates 510. Each clamp plate 510 and one or more sides of the rail support bracket 508 each have at least one, or more typically, two fastener holes 514. The fastener holes 514 are typically unthreaded, but in some embodiments may be threaded. Each clamp plate 510 is used to secure one, or more typically, two rails 504 to the rail support bracket 508. Each clamp plate 510 is secured to the rail support bracket 508 with at least one fastener 512, but two are typically used. Each fastener 512 passes through one of the fastener holes 514 in the rail support bracket 508 and a matching fastener hole 514 in the clamp plate 510. Each fastener 512 and associated fastener holes 514 are positioned to hold an adjacent rail 504 between the fastener 512 and an adjacent side of the rail support bracket 508 with at least a sliding fit. However, the rails 504 are primarily held in place by friction induced by tension in the fasteners 512 drawing the clamp plate 510 and the rail support bracket 508 together. Therefore, in some embodiments, the fasteners 512 may not necessarily be adjacent and in sliding contact with the rails 504.

The quad-rail beam 500 has a cavity therein defined as an area between the inside corners of the four rails 504 and running a length of the four rails 504. The cavity contains no load bearing structure connecting the rails that runs for more than a total of a half of the length of the rails. This arrangement makes efficient use of mass since structure in the cavity will have little resistance to torque induced twist.

Typically, each rail 504 has dimensions of 1 inch per side in cross-section, 14-gauge thickness and 40 inches long. The rail support bracket 508 has typical dimensions of 6 inches per side in the interior of the bracket. These dimensions provide 4 inch gaps between the rails 504, which provides good resistance to twist induced by torque, and which also provides a convenient sized gap into which a typical worker can reach into and attach, detach or adjust accessory brackets and other attachments. However, in alternative embodiments, other dimensions of rails 504 and rail support brackets 508 may be used.

The quad-rail beam 500 has a structure that for its weight is highly resistant to twist induced by torque about its long axis (parallel to the rails 504). For example, a torque is applied to the first exemplary embodiment quad-rail beam 500, when a force is applied to one or more of the rails 504 in a direction that is orthogonal to the long axis of the quad-rail beam 500, but does not pass through the long axis. The torque is transmitted along the rail 504 to the nearest rail support brackets 508. The rail support brackets 508 transfer the torque to the other rails 504. All the rails 504 and the rail support brackets 508 play a role in resisting the twist induced by the torque. Resistance to torque is proportional to the mass of an object times the distance of the mass from the torque axis. Most of the mass in the quad-rail beam 500 is fairly distant from its long axis, so for its mass, it offers a high degree of resistance to being twisted by torque. Resistance to twist from torque can be increased by adding additional rail support brackets 508 to the quad-rail beam 500 and/or decreasing the distance between them. Since each rail 504 is itself a tube, it also offers a high degree of resistance to twisting from torque induced by forces applied to the rail 504 in a direction that does not pass through the long axis of the rail 504.

Rail-Arm-Leg (RAL) Module

First Exemplary Embodiment

Figure 25A:
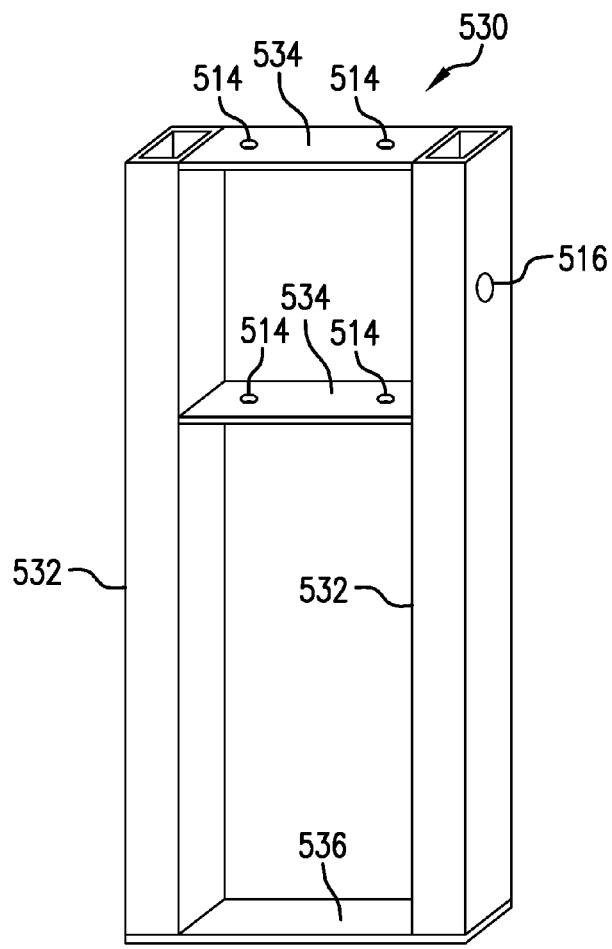
FIGS. 25A and 25B show a first embodiment of a rail-arm-leg (RAL) module.
Figure 25B:
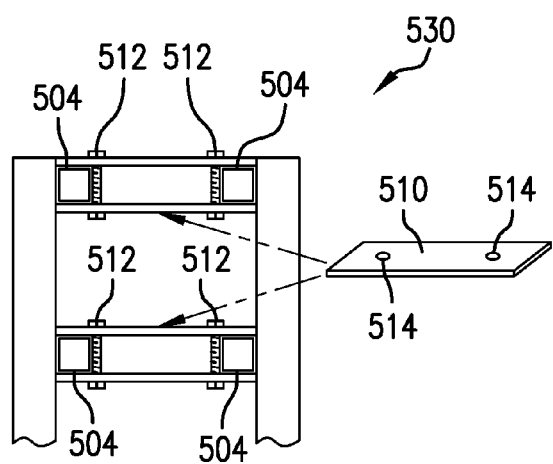

FIGS. 25A and 25B show a first embodiment of a rail-arm-leg (RAL) module 530. The rail-arm-leg module 530 is a useful building block for building structures such as industrial work stations. The rail-arm-leg module 530 is part of a peripheral binding structure that also includes two clamp plates 510 and a plurality of fasteners 512 and is configured to hold each of four rails 504 in a rectangular pattern. The rail-arm-leg module 530 comprises two columns 532 coupled by two cross plates 534 and a bottom plate 536. The columns 532 are typically orthogonal from the cross plates 534 and the bottom plate 536, with the two columns 532 arranged vertically in parallel and the two cross plates 534 and bottom plate 536 arranged horizontally in parallel. The columns 532 and the cross plates 534 define a module interior with a perimeter conforming to the rectangular pattern. The columns 532, the cross plates 534, and the bottom plate 536 are typically made of metal, such as steel, and coupled by welding, but may be made of other suitable materials and joined by other methods.

The columns 532 are hollow tubes with open top and bottom ends. In some embodiments, the bottom ends of the column 532 are closed off. Each column 532 has one or more threaded hole 516, typically in the outside of the column 532. The threaded hole 516 allows for insertion of a screw faster that can be used to secure accessories inserted inside the column 532. Each column 532 is typically rectangular in cross-section and may be square. In other embodiments, other suitable cross-sections, such as circular, may be used.

The rail-arm-leg module 530 is typically used with at least one, or more typically, two clamp plates 510. Each clamp plate 510 is typically the same size and shape as the cross plates 534. The clamp plates 510 and the cross plates 534 have at least one, or more typically, two fastener holes 514. The fastener holes 514 are typically unthreaded, but in some embodiments may be threaded. Each clamp plate 510 is used to secure one, or more typically, two rails 504 to the rail-arm-leg module 530. Each clamp plate 510 is secured to one of the cross plates 534 with at least one fastener 512, but two are typically used. Each fastener 512 passes through one of the fastener holes 514 in the cross plate 534 and a matching fastener hole 514 in the clamp plate 510. Each fastener 512 and associated fastener holes 514 are positioned to hold an adjacent rail 504 between the fastener 512 and an adjacent column 532 with at least a sliding fit. However, the rails 504 are primarily held in place by friction induced by tension in the fasteners 512 drawing the clamp plate 510 and the rail support bracket 508 together. Therefore, in some embodiments, the fasteners 512 may not necessarily be adjacent and in sliding contact with the rails 504.

The typical dimensions for the rail-arm-leg module 530 is 20 inches high and 8½ inches wide across the front. The interior space of the rail-arm-leg module 530 is typically 6 inches wide and 1½ inches deep. The space between the two cross plates 534 is typically 6 inches. These dimensions are convenient for building industrial workstations, but other dimensions may be used. The cross plate 534 nearest the top of the rail-arm-leg module 530 is typically flush with the top of the columns 532, but in some embodiments may positioned lower.

Rail-Arm-Leg (RAL) Assembly

First Exemplary Embodiment

Figure 26:
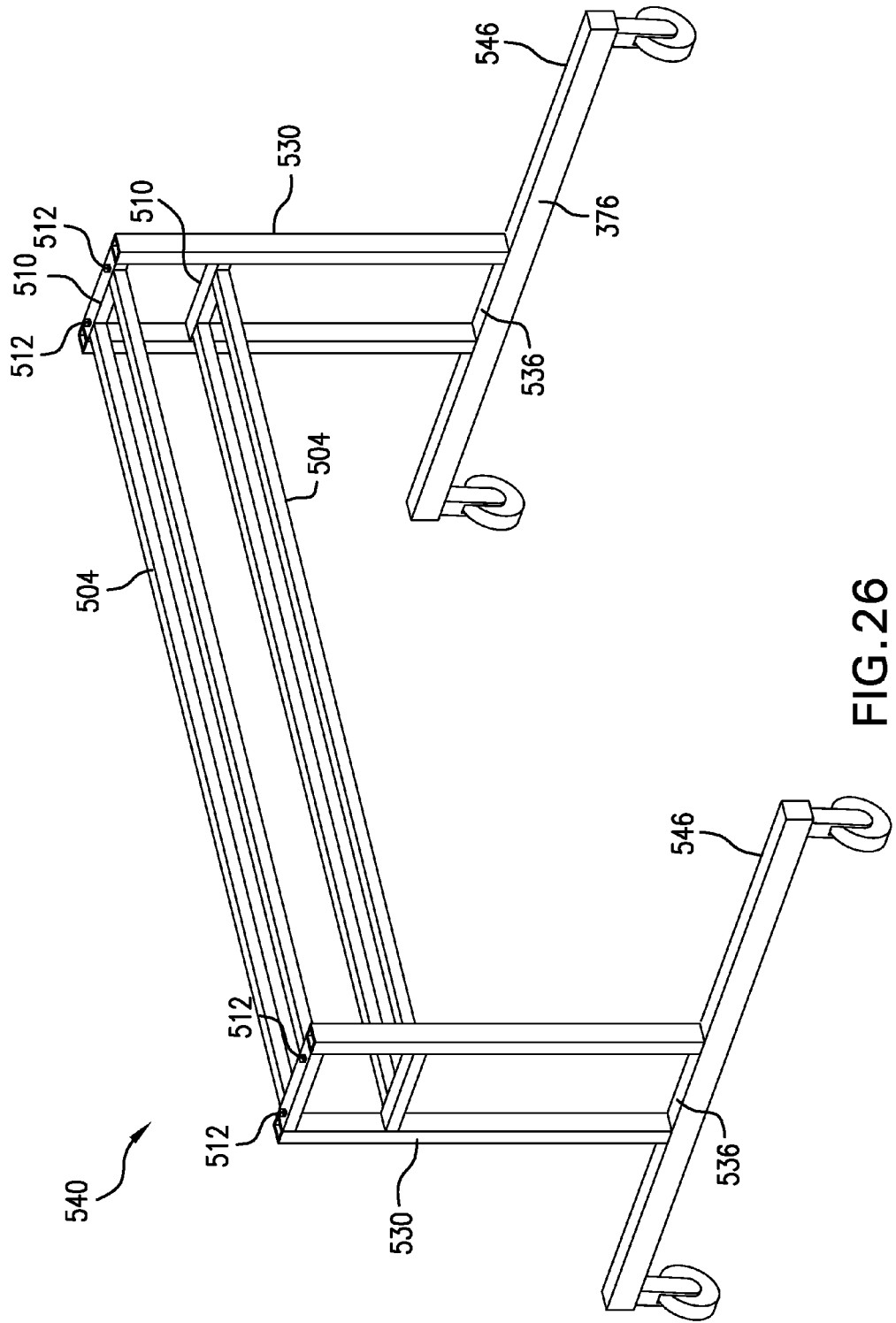
FIGS. 26 and 27 show a first embodiment of a rail-arm-leg assembly.
Figure 27:
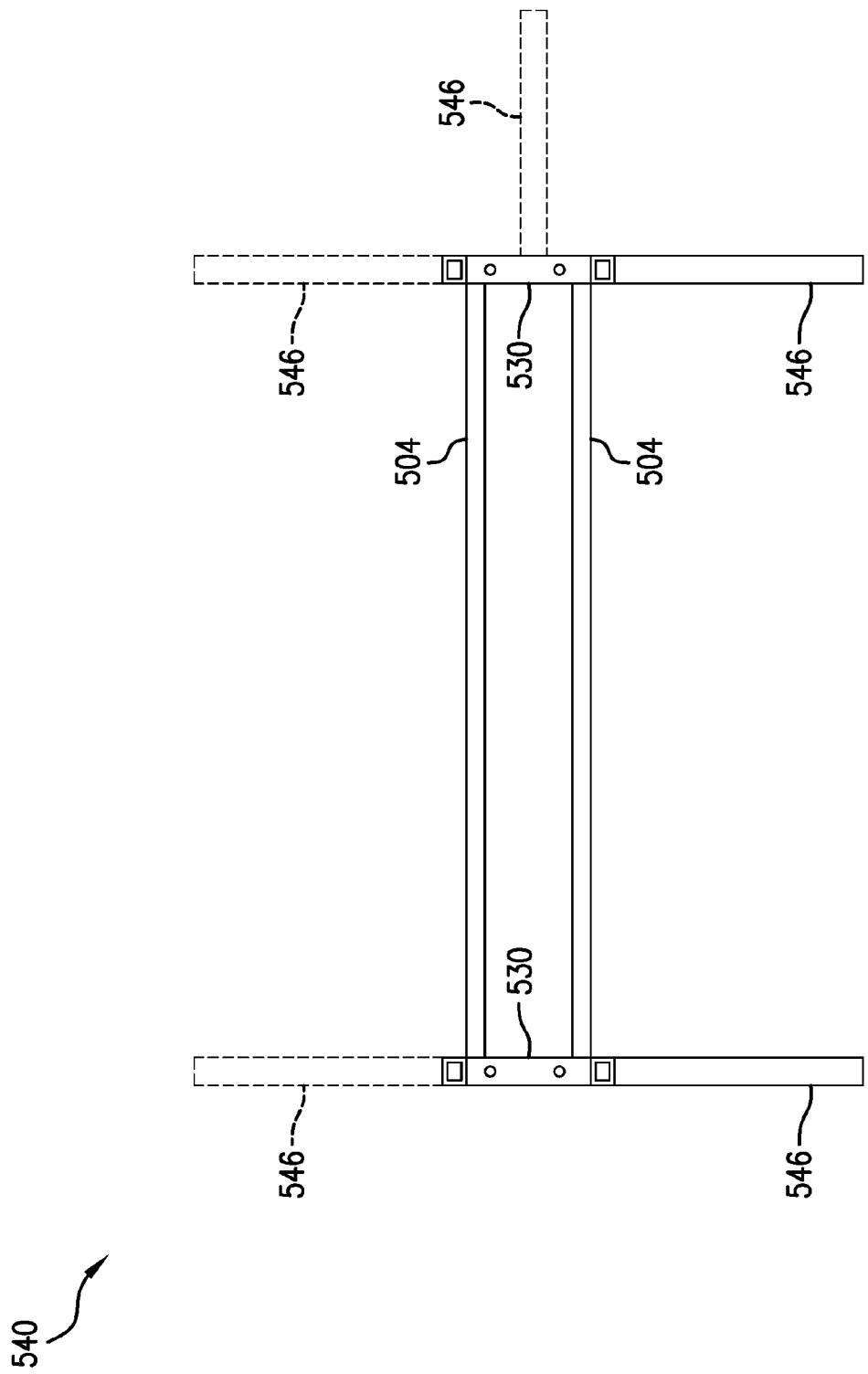

FIGS. 26 and 27 show a first embodiment of a rail-arm-leg assembly 540. The rail-arm-leg assembly 540 comprises two rail-arm-leg modules 530 and four rails 504. The rails 504 are secured to the rail-arm-leg modules 530 with cross plates 534 and fasteners 512 as described elsewhere herein. While the first embodiment rail-arm-leg assembly 540 may be freestanding without them, typically it has one or more sets of legs 546 to give it greater stability. The legs 546 are coupled to the bottom of the rail-arm-leg module 530. Typically, a set of legs 546 has one or more legs 546 that extend out horizontally. The set of legs 546 typically has two vertical posts that are positioned and sized to slidingly insert into the bottom openings of the columns 532 of a rail-arm-leg module 530, held in place by gravity, a tightening screw, or some other suitable mechanism. In other embodiments, the set of legs 546 is more permanently coupled to the rail-arm-leg module 530 by welding, fasteners or other suitable mechanism.

The rail-arm-leg assembly 540 has a cavity therein defined as an area between the inside corners of the four rails 504 and running a length of the four rails 504. The cavity contains no load bearing structure connecting the rails that runs for more than a total of a half of the length of the rails. This arrangement makes efficient use of mass since structure in the cavity will have little resistance to torque induced twist.

Rail-Arm-Leg (RAL) Assembly

Application Examples

Figure 28:
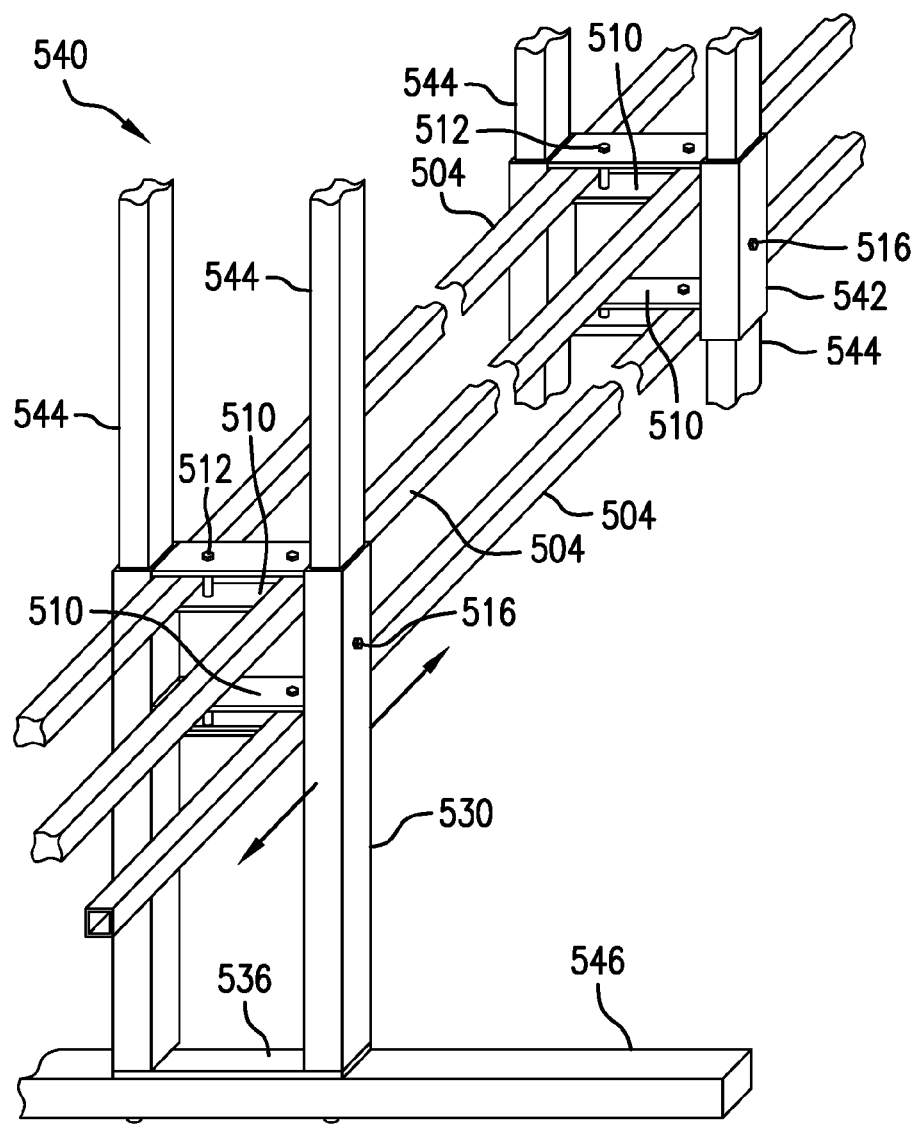
FIG. 28 shows part of a first embodiment rail-arm-leg assembly with arms attached and a rails-and-arm support bracket.

FIG. 28 shows part of a first embodiment rail-arm-leg assembly 540 with arms 544 attached and a rails-and-arm support bracket 542. The arms 544 may support accessories such as table tops, lighting fixtures, cabinets, tool holders, computer monitors, etc. The arms 544 are shaped and sized to have a sliding fit when inserted into the top opening of the columns 532 of a rail-arm-leg module 530. Once inserted and in a desired position, an arm 544 is held in that position with a tightening screw turned into a threaded hole 516 in the side of the column 532. In other embodiments may have other suitable mechanisms for locking the arm 544 in position.

The rails-and-arm support bracket 542 has a function similar to that of the rail support bracket 508, providing support to the rails 504, but additional has the function of providing attachment points for arms 544. The top and bottom have fastener holes 514 for fasteners 512 to pass through, as in the rail support bracket 508, but the sides are tubes, shaped and sized to provide a sliding fit with the arms 544 to be used with them. Once inserted and in a desired position, an arm 544 is held in that position with a tightening screw turned into a threaded hole 516 in the side of the rails-and-arm support bracket 542. In other embodiments may have other suitable mechanisms for locking the arm 544 in position. The rails-and-arm support bracket 542 may be used at a part of the first embodiment rail-arm-leg assembly 540 where arms are desired, but legs 546 are not.

FIGS. 29A, 29B, and 29C respectively show top, front, and side views of an arm bracket 550. The arm bracket 550 comprises an arm tube 554 coupled to an arm bracket plate 555. The arm bracket plate 555 is configured to clamp onto two rails 504 of a first exemplary embodiment quad-rail beam 500 or a first embodiment rail-arm-leg assembly 540 and has two arm bracket lips 556 that are sized and positioned to match the distance across the rails and hold the arm bracket 550 onto the rails 504. The arm bracket plate 555 has a plurality of fastener holes 514. Fasteners 512 may pass to these fastener holes 514 and through matching fastener holes 514 in a clamp plate 558 to secure the arm bracket 550 to the rails 504. The arm tube 554 is shaped and sized to provide a sliding fit to the arms 544 to be used with it. The arm tube 554 has a tightening screw 552 coupled thereto, which is configured to hold in position an arm 544 that has been inserted into the arm tube 554.

Figure 30:
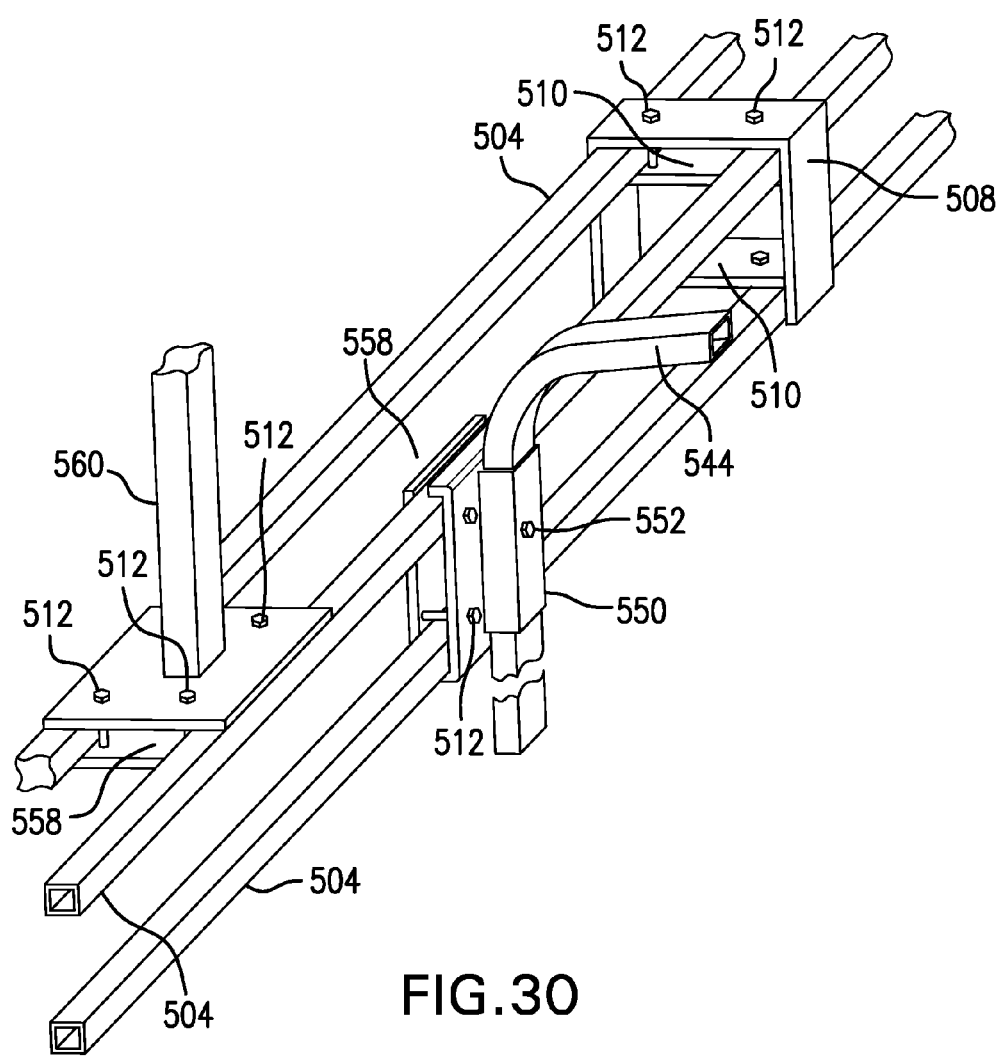
FIG. 30 shows various brackets for use with the first exemplary embodiment quad-rail beam or first embodiment rail-arm-leg assembly.

FIG. 30 shows various brackets for use with the first exemplary embodiment quad-rail beam 500 or first embodiment rail-arm-leg assembly 540. The arm bracket 550 and the rail support bracket 508 have been discussed elsewhere.

A top mount support 560 is configured to attach to the top side of two rails 504 with a clamp plate 558. The top mount support 560 is intended to support work station accessories computer monitors, tool holders, light fixtures, etc.

Figure 31:
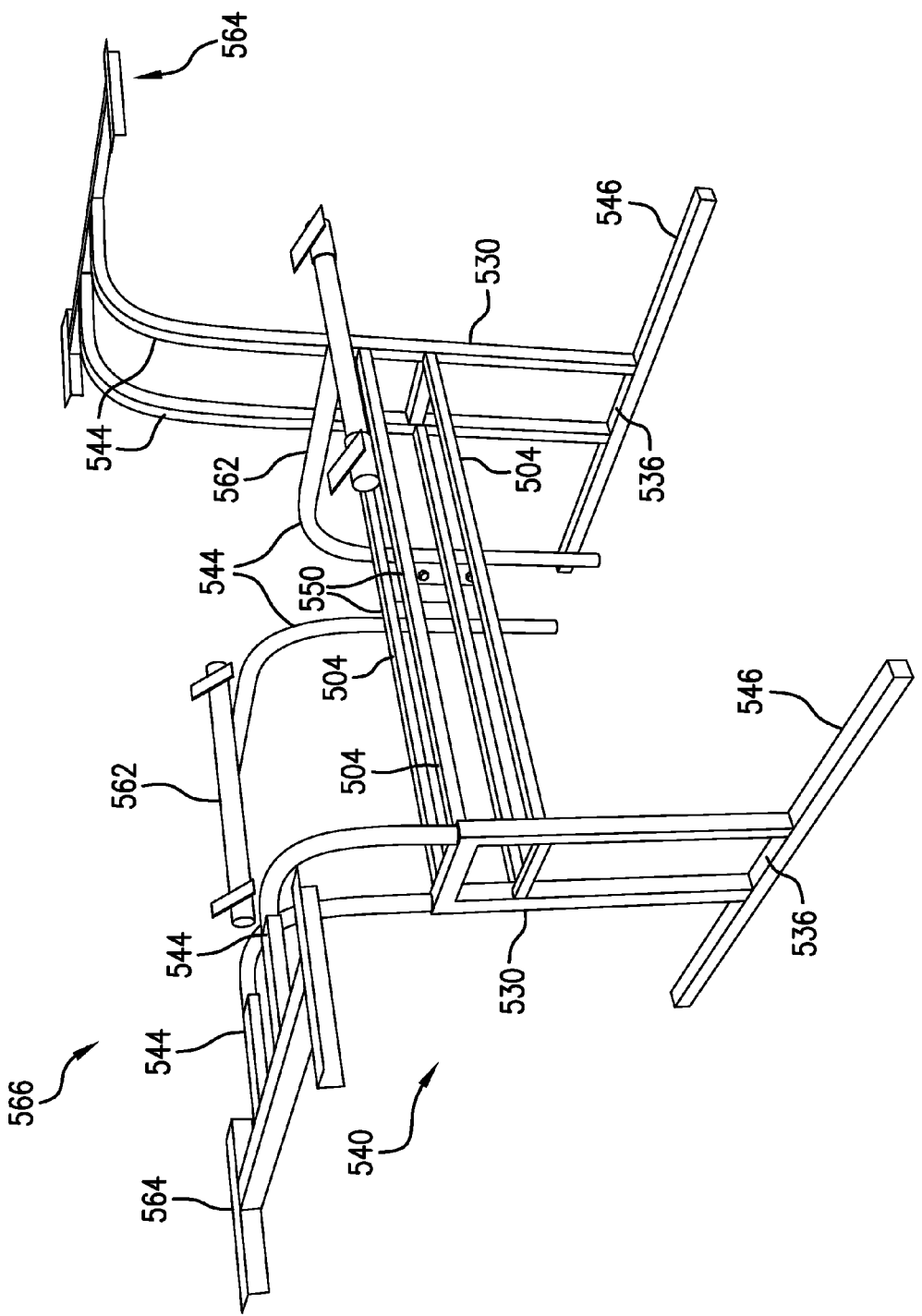
FIG. 31 shows a perspective view of a seventh exemplary workstation arrangement based on a first embodiment rail-arm-leg assembly.

FIG. 31 shows a perspective view of a seventh exemplary workstation arrangement 566 based on a first embodiment rail-arm-leg assembly 540. The workstation arrangement 566 comprises a rail-arm-leg assembly 540 with two double-arm table support brackets 564 and two single-arm table support brackets 562. Tables are omitted in FIG. 31 to better show the underlying structure of the workstation arrangement 566. Each of the two double-arm table support brackets 564 is coupled to two arms 544, which insert into the columns 532 of one of the two rail-arm-leg modules 530 of the rail-arm-leg assembly 540. Each of the single-arm table support brackets 562 is coupled to an arm 544, which is inserted into an arm bracket 550 mounted to two of the four rails 504.

Figure 32:
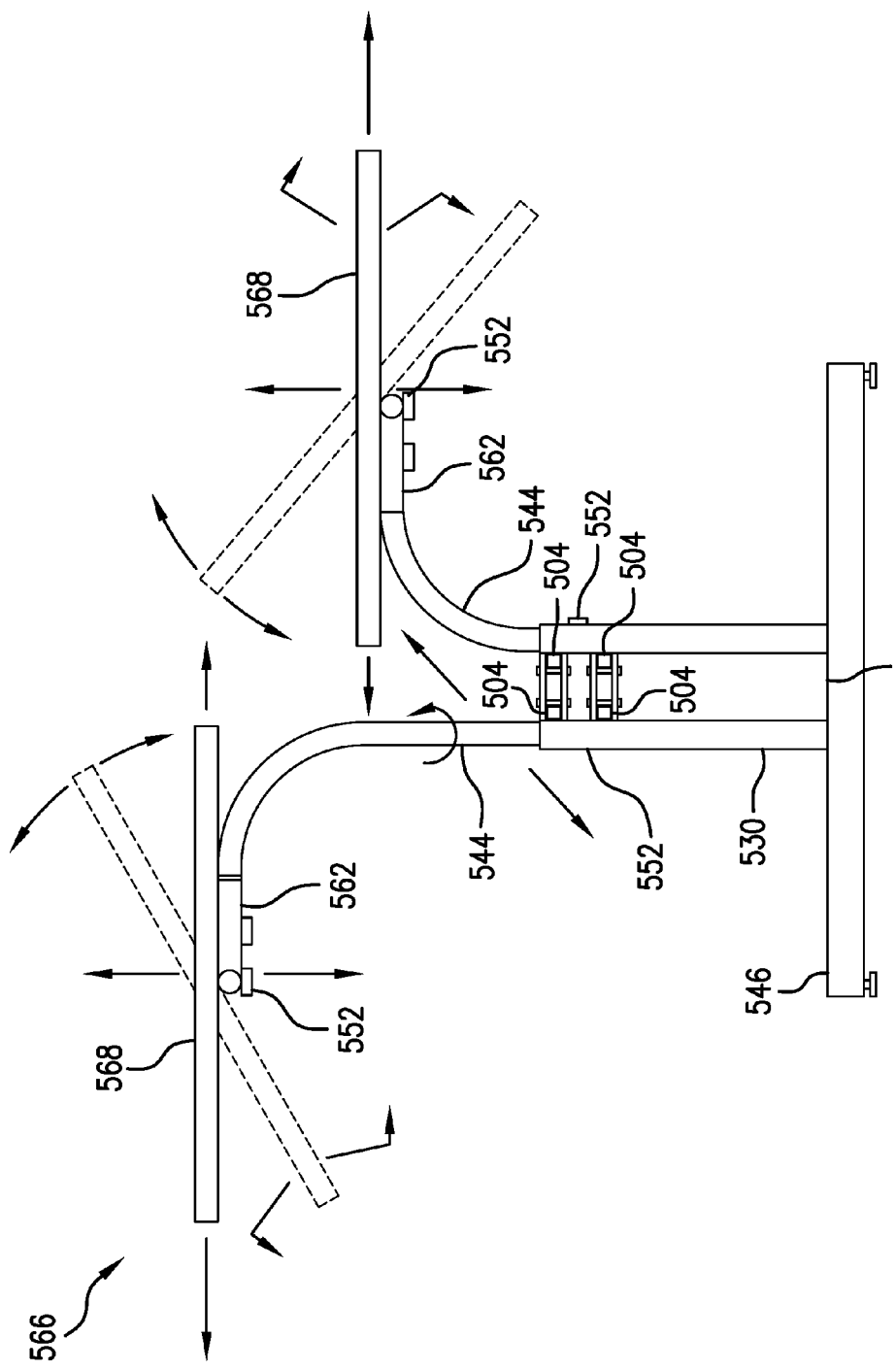
FIG. 32 shows a side view of the exemplary workstation arrangement based on a first embodiment rail-arm-leg assembly.

FIG. 32 shows a side view of the exemplary workstation arrangement 566 based on a first embodiment rail-arm-leg assembly 540. The double-arm table support bracket 564 are not shown to better illustrate the operation of the single-arm table support brackets 562. Table tops 568 are coupled to the single-arm table support brackets 562. The single-arm table support brackets 562 are configured to allow the table tops 568 to tilt to a desired work position. The tilt and height of each table top 568 can be adjusted independently and locked in a desired position with the tightening screws 552 on the single-arm table support bracket 562 and arm bracket 550 respectively.

Figure 33:
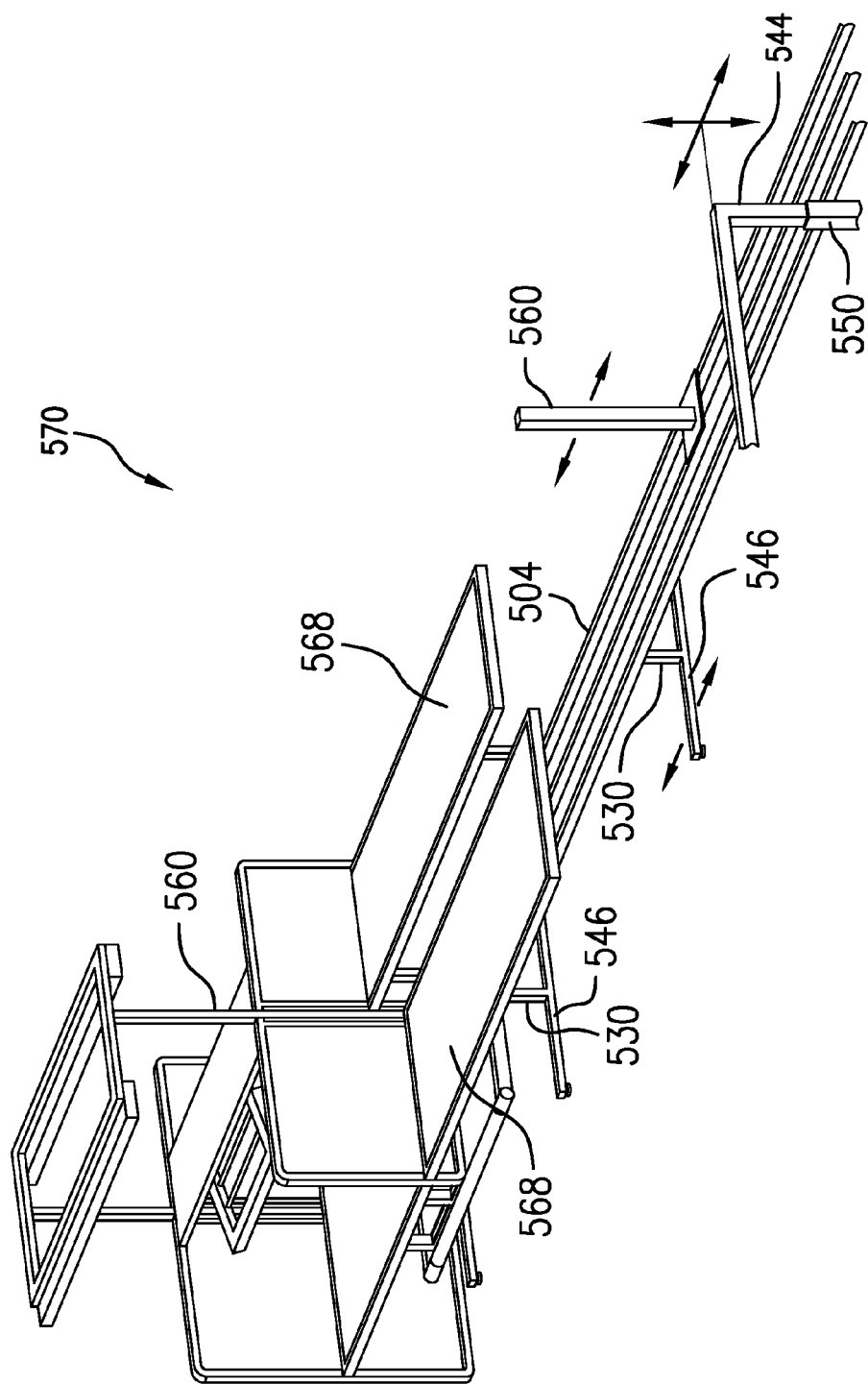
FIG. 33 shows a perspective view of an eighth exemplary workstation arrangement based on a first embodiment rail-arm-leg assembly.

FIG. 33 shows a perspective view of an eighth exemplary workstation arrangement 570 based on a first embodiment rail-arm-leg assembly 540. This workstation arrangement 570 has multiple first embodiment rail-arm-leg assemblies 540 connected in series. Rail-arm-leg modules 530 are used to splice different sections of rails 504.

FIG. 34 shows cable cradles 572 for use with the quad-rail beam 500 or the rail-arm-leg assembly 540. The cable cradles 572 insert between the rails 504 and are held in place by gravity and/or by clipping onto the rails 504. Power and communications cables may be run to workstation accessories using the cable cradles 572.

What is claimed is:

1. A workstation assembly comprising:
    a rail-arm-leg assembly comprising a plurality of rail-arm-leg modules, and at least four rails;
    a plurality of fasteners;
    a plurality of legs, at least one leg each coupled to at least two of the rail-arm-leg modules;
    wherein the four rails are tubular and rectangular in cross-section, arranged in parallel lengthwise and in a pattern that is rectangular in cross-section, the rectangular pattern having four pattern corners, each of the four rails comprising four rail corners including an inside rail corner and an outside rail corner, wherein the outside rail corner of each of the four rails is in a different one of the four pattern corners, wherein the four rails are spaced apart from each other;
    wherein each of the rail-arm-leg modules is coupled to each of the four rails, holding each of the four rails in the rectangular pattern;
    wherein the rail-arm-leg module comprises two columns coupled by two cross plates, and a bottom plate, with the columns oriented orthogonal to the cross plates and the bottom plate;
    wherein the columns and the cross plates define a module interior with a perimeter conforming to the rectangular pattern;
    wherein two clamp plates are positioned within the module interior and each clamp plate is adjacent two of the four rails;
    wherein at least one of the fasteners passes through one of the cross plates and one of the clamp plates;
    wherein each of the four rails is in sliding contact with one of the columns of one of the rail-arm-leg modules and with one of the fasteners; and
    wherein the columns comprise hollow tubes with open top ends.

2. The workstation assembly of claim 1, further comprising a cavity defined as an area between the inside corners of the four rails and running a length of the four rails, wherein the cavity contains no load bearing structure connecting the rails that runs for more than a total of a half of the length of the rails.

3. The workstation assembly of claim 1, further comprising
    an arm bracket clamped to two of the four rails with a clamp plate and with at least two of the fasteners;
    wherein the arm bracket comprises an arm tube coupled to an arm bracket plate;
    wherein the arm bracket plate has two arm bracket lips that are positioned to match a distance across the rails and hold the arm bracket onto the rails; and
    an arm positioned within the arm tube, the arm shaped and sized to provide a sliding contact with the arm tube.

4. The workstation assembly of claim 3, further comprising a table coupled to the arm.

5. The workstation assembly of claim 1, further comprising an arm positioned within one of the columns of one of the rail-arm-leg modules, the arm shaped and sized to provide a sliding contact with the column.

6. The workstation assembly of claim 5, further comprising a table coupled to the arm.

* * * * *